(12) United States Patent
Abedini et al.

(10) Patent No.: US 12,301,489 B2
(45) Date of Patent: May 13, 2025

(54) MANAGING WIRELESS COMMUNICATIONS FOR LEAKY-WAVE ANTENNAS

(71) Applicant: QUALCOMM Incorporated, San Diego, CA (US)

(72) Inventors: Navid Abedini, Basking Ridge, NJ (US); Kapil Gulati, Belle Mead, NJ (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/482,249

(22) Filed: Sep. 22, 2021

(65) Prior Publication Data

US 2023/0092664 A1    Mar. 23, 2023

(51) Int. Cl.
*H04L 5/00* (2006.01)
*H04W 52/54* (2009.01)
*H04W 72/044* (2023.01)

(52) U.S. Cl.
CPC ............ *H04L 5/0048* (2013.01); *H04L 5/006* (2013.01); *H04W 52/54* (2013.01); *H04W 72/0473* (2013.01)

(58) Field of Classification Search
CPC ..... H04L 5/0048; H04L 5/006; H04L 5/0007; H04W 52/54; H04W 72/0473
See application file for complete search history.

(56) References Cited

U.S. PATENT DOCUMENTS

| 7,684,381 B2 * | 3/2010 | Schrum, Jr. ........... H04J 3/0652 370/473 |
| 8,140,103 B2 * | 3/2012 | Wu ....................... H04W 52/46 455/67.11 |

(Continued)

OTHER PUBLICATIONS

Ghasempour Y., et al., "Single Shot Single Antenna Path Discovery in THz Networks", MobiCom, 2020, pp. 1-13.

(Continued)

*Primary Examiner* — Ajit Patel
*Assistant Examiner* — Ilfred Thomas
(74) *Attorney, Agent, or Firm* — QUALCOMM Incorporated

(57) ABSTRACT

Methods, systems, and devices for wireless communication are described. A communication device, such as a base station or a user equipment (UE) may generate a beacon signal based on a nonuniform power spectral density configuration. The communication device may transmit control signaling indicating a nonuniform power spectral density profile associated with the beacon signal. The nonuniform power spectral density profile may indicate a respective power offset associated with the beacon signal for one or more subset of resource elements of a set of resource elements. The communication device may transmit the beacon signal. Additionally or alternatively, the communication device may receive control signaling indicating the nonuniform power spectral density profile associated with the beacon signal. Based on the nonuniform power spectral density profile, the communication device may receive the beacon signal.

30 Claims, 17 Drawing Sheets

(56) References Cited

U.S. PATENT DOCUMENTS

| | | | |
|---|---|---|---|
| 2007/0202901 A1* | 8/2007 | Hulbert | H04W 52/243 |
| | | | 455/501 |
| 2008/0062929 A1* | 3/2008 | Leonidov | H04L 5/0053 |
| | | | 370/331 |
| 2009/0081970 A1* | 3/2009 | Yavuz | H04L 5/0005 |
| | | | 455/114.2 |
| 2010/0048212 A1* | 2/2010 | Yavuz | H04W 52/244 |
| | | | 455/436 |
| 2010/0189093 A1* | 7/2010 | Palanki | H04B 17/345 |
| | | | 370/344 |
| 2013/0089021 A1* | 4/2013 | Gaal | H04B 7/155 |
| | | | 370/315 |
| 2014/0098757 A1* | 4/2014 | Khandekar | H04L 1/0003 |
| | | | 370/329 |
| 2015/0065190 A1* | 3/2015 | Rudolf | H04W 52/367 |
| | | | 455/522 |
| 2019/0045465 A1* | 2/2019 | Lee | H04W 92/18 |
| 2019/0140729 A1* | 5/2019 | Zhang | H04W 52/16 |
| 2020/0053544 A1* | 2/2020 | Lindoff | H04W 8/005 |
| 2021/0029619 A1* | 1/2021 | Breaux, III | H04W 48/04 |
| 2021/0100027 A1* | 4/2021 | Xue | H04W 52/365 |
| 2021/0219144 A1* | 7/2021 | Schwengler | H04W 48/14 |
| 2021/0243739 A1* | 8/2021 | Zhao | H04W 72/23 |
| 2021/0337460 A1* | 10/2021 | Breaux, III | H04W 48/04 |
| 2022/0271874 A1* | 8/2022 | Behravan | H04L 5/0051 |
| 2023/0292355 A1* | 9/2023 | Peng | H04W 72/542 |
| | | | 370/329 |

OTHER PUBLICATIONS

Ghasempour Y., et al., "Single-Shot Link Discovery for Terahertz Wireless Networks", Nature communications, 2020, pp. 1-6.

* cited by examiner

MANAGING WIRELESS COMMUNICATIONS FOR LEAKY-WAVE ANTENNAS

FIELD OF TECHNOLOGY

The following relates to wireless communication, including managing wireless communications for leaky-wave antennas.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). These communication devices may support wireless communications using leaky-wave antennas. In some cases, wireless communications (e.g., signals) propagating through leaky-wave antennas may experience different propagation channels such that an angle of emission may be coupled to a frequency of the wireless communications (e.g., signals). Some communication devices may experience reduced reliability for wireless communications associated with leaky-wave antennas.

SUMMARY

The described techniques relate to improved methods, systems, devices, and apparatuses that support managing wireless communications for leaky-wave antennas. A communication device may generate and transmit one or more beacon signals to another communication device via a leaky-wave antenna. In some cases, the one or more beacon signals may be transmitted to establish a connection or to determine a beam for communicating with another communication device, for example, as part of a beam training procedure. A communication device may generate and transmit a beacon signal based on a nonuniform power spectral density configuration. In some case, the communication device may also transmit control signaling indicating a nonuniform power spectral density profile associated with the beacon signal.

The nonuniform power spectral density profile may indicate a respective power offset associated with the beacon signal for one or more subsets of resource elements. In response, the communication device may receive a report indicating information associated with the beacon signal. The report may indicate one or more power signature identifiers associated with the beacon signal. Additionally or alternatively, the report may indicate a set of correlation received signal strength indicators (RSSIs) associated with the set of power signature identifiers. By managing wireless communications for leaky-wave antennas, the communication device may experience low latency and high reliability for wireless communications associated with leaky-wave antennas.

A method for wireless communication at a device is described. The method may include generating a beacon signal based on a nonuniform power spectral density configuration, transmitting control signaling indicating a nonuniform power spectral density profile associated with the beacon signal, the nonuniform power spectral density profile indicating a respective power offset associated with the beacon signal for one or more subset of resource elements of a set of resource elements, and transmitting the beacon signal.

An apparatus for wireless communication at a device is described. The apparatus may include a processor, memory coupled with the processor, and instructions stored in the memory. The instructions may be executable by the processor to cause the apparatus to generate a beacon signal based on a nonuniform power spectral density configuration, transmit control signaling indicating a nonuniform power spectral density profile associated with the beacon signal, the nonuniform power spectral density profile indicating a respective power offset associated with the beacon signal for one or more subset of resource elements of a set of resource elements, and transmit the beacon signal.

Another apparatus for wireless communication at a device is described. The apparatus may include means for generating a beacon signal based on a nonuniform power spectral density configuration, means for transmitting control signaling indicating a nonuniform power spectral density profile associated with the beacon signal, the nonuniform power spectral density profile indicating a respective power offset associated with the beacon signal for one or more subset of resource elements of a set of resource elements, and means for transmitting the beacon signal.

A non-transitory computer-readable medium storing code for wireless communication at a device is described. The code may include instructions executable by a processor to generate a beacon signal based on a nonuniform power spectral density configuration, transmit control signaling indicating a nonuniform power spectral density profile associated with the beacon signal, the nonuniform power spectral density profile indicating a respective power offset associated with the beacon signal for one or more subset of resource elements of a set of resource elements, and transmit the beacon signal.

In some examples of the method, apparatuses, and non-transitory computer-readable medium described herein, transmitting the beacon signal may include operations, features, means, or instructions for transmitting, based on the nonuniform power spectral density configuration, the beacon signal at a first transmit power level for a first subset of resource elements of the set of resource elements and a second transmit power level for a second subset of resource elements of the set of resource elements.

In some examples of the method, apparatuses, and non-transitory computer-readable medium described herein, the first subset of resource elements includes a first subset of frequencies of a set of frequencies and the second subset of resource elements includes a second subset of frequencies of the set of frequencies.

In some examples of the method, apparatuses, and non-transitory computer-readable medium described herein, the first subset of resource elements and the second subset of resource elements may be associated with different time-domain resources and transmitting the beacon signal may be based on time-division multiplexing the first subset of resource elements and the second subset of resource elements.

Some examples of the method, apparatuses, and non-transitory computer-readable medium described herein may further include operations, features, means, or instructions for transmitting second control signaling indicating a second nonuniform power spectral density profile associated with the second subset of resource elements, the second nonuniform power spectral density profile indicating a respective power offset associated with the second subset of resource elements.

In some examples of the method, apparatuses, and non-transitory computer-readable medium described herein, the first subset of resource elements spans a first bandwidth part of a bandwidth and the second subset of resource elements spans a second bandwidth part of the bandwidth.

In some examples of the method, apparatuses, and non-transitory computer-readable medium described herein, a first total transmit power level may be split between each resource element of the first subset of resource elements and a second total transmit power level may be split between each resource element of the second subset of resource elements.

Some examples of the method, apparatuses, and non-transitory computer-readable medium described herein may further include operations, features, means, or instructions for transmitting capability information indicating support for nonuniform power spectral density operation, receiving second control signaling indicating the nonuniform power spectral density configuration based on the capability information, and where the second control signaling includes semi-static control signaling including radio resource control (RRC) signaling, or dynamic control signaling including downlink control information (DCI) or medium access control-control element (MAC-CE).

A method for wireless communication at a device is described. The method may include transmitting a beacon signal and receiving a report indicating one or more of a set of power signature identifiers associated with the beacon signal or a set of correlation received signal strength indicators (RSSIs) associated with the set of power signature identifiers.

An apparatus for wireless communication at a device is described. The apparatus may include a processor, memory coupled with the processor, and instructions stored in the memory. The instructions may be executable by the processor to cause the apparatus to transmit a beacon signal and receive a report indicating one or more of a set of power signature identifiers associated with the beacon signal or a set of correlation RSSIs associated with the set of power signature identifiers.

Another apparatus for wireless communication at a device is described. The apparatus may include means for transmitting a beacon signal and means for receiving a report indicating one or more of a set of power signature identifiers associated with the beacon signal or a set of correlation RSSIs associated with the set of power signature identifiers.

A non-transitory computer-readable medium storing code for wireless communication at a device is described. The code may include instructions executable by a processor to transmit a beacon signal and receive a report indicating one or more of a set of power signature identifiers associated with the beacon signal or a set of correlation RSSIs associated with the set of power signature identifiers.

In some examples of the method, apparatuses, and non-transitory computer-readable medium described herein, each correlation RSSI indicates a power amplitude associated with the beacon signal for each resource element of one or more subset of resource elements of a set of resource elements.

In some examples of the method, apparatuses, and non-transitory computer-readable medium described herein, the report indicates a RSSI value for a peak power amplitude associated with the beacon signal for one or more subset of resource elements of a set of resource elements.

In some examples of the method, apparatuses, and non-transitory computer-readable medium described herein, the report indicates an ordering of one or more of a set of estimated angle of departures associated with the beacon signal or the set of power signature identifiers.

In some examples of the method, apparatuses, and non-transitory computer-readable medium described herein, the report indicates that one or more of a respective estimated angle of departure of a set of estimated angle of departures or a respective power signature identifier of the set of power signature identifiers corresponds to a line of sight (LOS) path or a non-line of sight (NLOS) path.

In some examples of the method, apparatuses, and non-transitory computer-readable medium described herein, the report indicates a number of resource elements of a set of resource elements satisfying a power amplitude threshold, the number of resource elements of the set of resource elements neighboring a resource element corresponding to a peak power amplitude associated with the beacon signal.

In some examples of the method, apparatuses, and non-transitory computer-readable medium described herein, the report indicates one or more of a RSSI corresponding to a peak power amplitude associated with the beacon signal or an average RSSI corresponding to a number of resource elements of a set of resource elements neighboring a resource element corresponding to the peak power amplitude associated with the beacon signal.

In some examples of the method, apparatuses, and non-transitory computer-readable medium described herein, the report indicates a range of frequencies associated with a peak power amplitude associated with the beacon signal.

In some examples of the method, apparatuses, and non-transitory computer-readable medium described herein, the report indicates one or more of angle of departures or frequency regions for a set of multiple clusters of resource element associated with the beacon signal based on a multipath propagation of the beacon signal.

A method for wireless communication at a device is described. The method may include receiving control signaling indicating a nonuniform power spectral density profile associated with a beacon signal, the nonuniform power spectral density profile indicating a respective power offset associated with the beacon signal for one or more subset of resource elements of a set of resource elements and receiving the beacon signal.

An apparatus for wireless communication at a device is described. The apparatus may include a processor, memory coupled with the processor, and instructions stored in the memory. The instructions may be executable by the processor to cause the apparatus to receive control signaling indicating a nonuniform power spectral density profile associated with a beacon signal, the nonuniform power spectral density profile indicating a respective power offset associated with the beacon signal for one or more subset of resource elements of a set of resource elements and receive the beacon signal.

Another apparatus for wireless communication at a device is described. The apparatus may include means for receiving control signaling indicating a nonuniform power spectral density profile associated with a beacon signal, the nonuniform power spectral density profile indicating a respective power offset associated with the beacon signal for one or more subset of resource elements of a set of resource elements and means for receiving the beacon signal.

A non-transitory computer-readable medium storing code for wireless communication at a device is described. The code may include instructions executable by a processor to receive control signaling indicating a nonuniform power spectral density profile associated with a beacon signal, the nonuniform power spectral density profile indicating a respective power offset associated with the beacon signal for one or more subset of resource elements of a set of resource elements and receive the beacon signal.

In some examples of the method, apparatuses, and non-transitory computer-readable medium described herein, receiving the beacon signal may include operations, features, means, or instructions for receiving, based on a nonuniform power spectral density configuration, the beacon signal at a first transmit power level for a first subset of resource elements of the set of resource elements and a second transmit power level for a second subset of resource elements of the set of resource elements.

In some examples of the method, apparatuses, and non-transitory computer-readable medium described herein, the first subset of resource elements includes a first subset of frequencies of a set of frequencies and the second subset of resource elements includes a second subset of frequencies of the set of frequencies.

In some examples of the method, apparatuses, and non-transitory computer-readable medium described herein, the first subset of resource elements and the second subset of resource elements may be associated with different time-domain resources and receiving the beacon signal may be based on a time-division multiplexing of the first subset of resource elements and the second subset of resource elements.

Some examples of the method, apparatuses, and non-transitory computer-readable medium described herein may further include operations, features, means, or instructions for receiving second control signaling indicating a second nonuniform power spectral density profile associated with the second subset of resource elements, the second nonuniform power spectral density profile indicating a respective power offset associated with the second subset of resource elements.

In some examples of the method, apparatuses, and non-transitory computer-readable medium described herein, the first subset of resource elements spans a first bandwidth part of a bandwidth and the second subset of resource elements spans a second bandwidth part of the bandwidth.

In some examples of the method, apparatuses, and non-transitory computer-readable medium described herein, a first total transmit power level may be split between each resource element of the first subset of resource elements and a second total transmit power level may be split between each resource element of the second subset of resource elements.

Some examples of the method, apparatuses, and non-transitory computer-readable medium described herein may further include operations, features, means, or instructions for receiving capability information indicating support for nonuniform power spectral density operation, transmitting second control signaling indicating the nonuniform power spectral density configuration based on the capability information, and where the second control signaling includes semi-static control signaling including RRC signaling, or dynamic control signaling including DCI or MAC-CE.

A method for wireless communication at a device is described. The method may include receiving a beacon signal and transmitting a report indicating one or more of a set of power signature identifiers associated with the beacon signal or a set of correlation RSSIs associated with the set of power signature identifiers.

An apparatus for wireless communication at a device is described. The apparatus may include a processor, memory coupled with the processor, and instructions stored in the memory. The instructions may be executable by the processor to cause the apparatus to receive a beacon signal and transmit a report indicating one or more of a set of power signature identifiers associated with the beacon signal or a set of correlation RSSIs associated with the set of power signature identifiers.

Another apparatus for wireless communication at a device is described. The apparatus may include means for receiving a beacon signal and means for transmitting a report indicating one or more of a set of power signature identifiers associated with the beacon signal or a set of correlation RSSIs associated with the set of power signature identifiers.

A non-transitory computer-readable medium storing code for wireless communication at a device is described. The code may include instructions executable by a processor to receive a beacon signal and transmit a report indicating one or more of a set of power signature identifiers associated with the beacon signal or a set of correlation RSSIs associated with the set of power signature identifiers.

In some examples of the method, apparatuses, and non-transitory computer-readable medium described herein, each correlation RSSI indicates a power amplitude associated with the beacon signal for each resource element of one or more subset of resource elements of a set of resource elements.

In some examples of the method, apparatuses, and non-transitory computer-readable medium described herein, the report indicates a RSSI value for a peak power amplitude associated with the beacon signal for one or more subset of resource elements of a set of resource elements.

In some examples of the method, apparatuses, and non-transitory computer-readable medium described herein, the report indicates an ordering of one or more of a set of estimated angle of departures associated with the beacon signal or the set of power signature identifiers.

In some examples of the method, apparatuses, and non-transitory computer-readable medium described herein, the report indicates that one or more of a respective estimated angle of departure of a set of estimated angle of departures or a respective power signature identifier of the set of power signature identifiers corresponds to a LOS path or a NLOS path.

DETAILED DESCRIPTION

Figure 1:
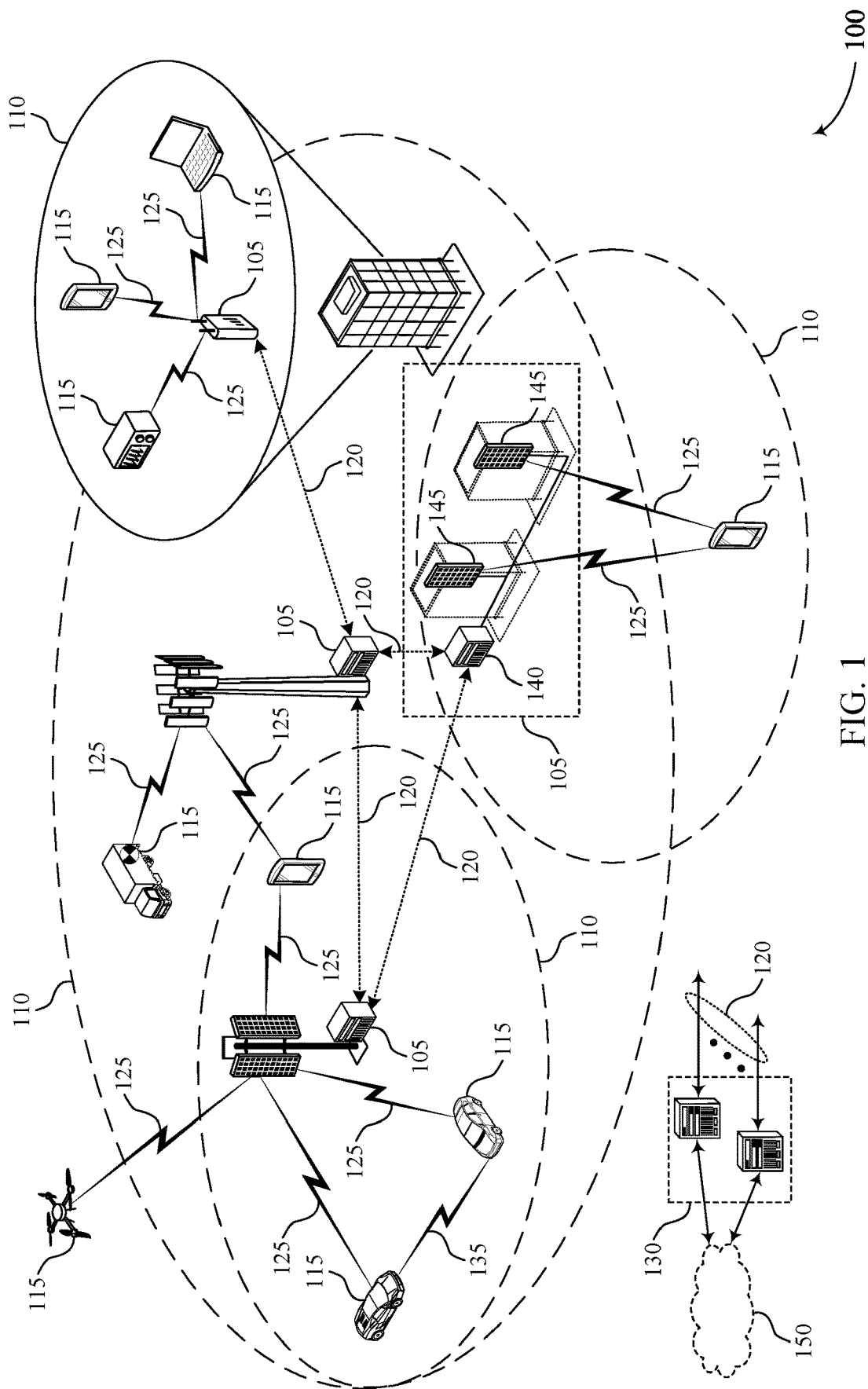
FIGS. 1 and 2 illustrate examples of wireless communications systems that support managing wireless communications for leaky-wave antennas in accordance with aspects of the present disclosure.

A wireless communications system may support both access links and sidelinks for communications between communication devices. An access link may refer to a communication link between a UE and a base station (e.g., via a Uu interface in an NR system). For example, an access link may support uplink signaling, downlink signaling, connection procedures, among other examples. A sidelink may refer to a communication link between similar communication devices (e.g., a communication link between UEs via a PC5 interface, or a backhaul communication link between base stations such as an integrated access and backhaul (IAB) communication link). In some examples, a sidelink may support device-to-device (D2D) communication, vehicle-to-everything (V2X), cellular V2X (C-V2X), or vehicle-to-vehicle (V2V) communication, proximity-based services (ProSe) communication, PC5 communication, IAB communication, message relaying, discovery signaling, beacon signaling, or any combination of these or other signals transmitted over-the-air from between communication devices. It is noted that the various examples provided herein may be used for any type of wireless communications devices (e.g., UEs or base stations) that use sidelink or access link communications.

Some communication devices (e.g., a base station or a UE) may transmit signals directly to other communication devices (e.g., another base station or another UE), for example using beamforming. Some communication devices may support beamforming operations such as frequency-domain beam sweeping. In some cases, frequency-domain beam sweeping may be used for an initial cell search or for establishing a communication link. In some examples, frequency-domain beam sweeping may be performed using a true-time delay analog array. For example, in an analog beamforming array, a signal may be transmitted from array elements with different beamforming weights $\{w_i\}$. However, in the absence of frequency selectivity of the wireless channel, the received signal at a UE may be flat in frequency. In such cases, a true-time delay analog array architecture may be used where different time-delays may be added to beamforming weights $\{w_i\}$. As such, beamforming may be frequency selective in different directions. For example, one fraction of the frequency components of the signal is pointing at one direction and another fraction of the frequency components of the signal is pointing at a different direction. In some cases, measurements may be reported by the receiving device where the transmitting device uses frequency-domain beam sweeping. In some other examples, frequency-domain beam sweeping may be performed using a slotted waveguide (e.g., a leaky-wave antenna). For example, a communication device may support wireless communications using a leaky-wave antenna. In some cases, wireless communications (e.g., signals) propagating through a leaky-wave antenna may experience different propagation channels such that an angle of emission (e.g., an angle at which a signal leaks into free space) may be coupled to the frequency of the wireless communications (e.g., signals).

A communication device may inject a wideband signal into a leaky-wave antenna to generate multiple beams and provide coverage over a wide angular region. The direction in which beams emit from the leaky-wave antenna may be coupled to the frequency components of the beam. As such, each generated beam may correspond to a different portion of the frequency components (e.g., a different portion of the carriers or subcarriers) included in the wideband signal. For example, beams with high frequency components may emit from a leaky-wave antenna at small angles (e.g., angles below a threshold) and beams with low frequency components may emit at large angles (e.g., angles above a threshold). For instance, beams corresponding to a subcarrier around 800 GHz may emit from a leaky-wave antenna at angles around 10 degrees measured from the axis of the leaky-wave antenna and beams corresponding to a subcarrier around 150 GHz may emit from the leak-wave antenna at angles around 80 degrees measured from the axis of the leaky-wave antenna. In some cases, each beam emitted from the leaky-wave antenna may have a spectral signature (e.g., a system response) with a peak amplitude that occurs at a frequency which is coupled to the angle at which the beam was emitted.

In some cases, beams emitted at large angles (e.g., angles greater than 50 degrees measured from an axis of the leaky-wave antenna) and beams emitted at small angles (e.g., angles less than 20 degrees measured from an axis of the leaky-wave antenna) may be impacted by a non-linearity of an angle-frequency coupling associated with a leaky-wave antenna. For example, beams emitted at small angles may propagate longer distances in a leaky-wave antenna than beams emitted at larger angles. As such, beams emitted at small angles may experience more attenuation than beams emitted at larger angles. In another example, the spectral signatures (e.g., the power spectral density) of beams emitted at large angles may be narrow with respect to the spectral signatures of beams emitted at smaller angles. Stated alternatively, the power spectral density (i.e., the distribution of power across the frequency components of the beam) may be narrow for beams emitted at large angles. In such cases, the energy of signals (e.g., beams) emitted at large angles may be low and, therefore, detection reliability at a receiving communication device may be low.

In some examples, a communication device may use a leaky-wave antenna to generate and transmit one or more periodic signals (e.g., beacon signals) to one or more other communication devices. For example, a communication device may generate a beacon signal according to a non-flat (e.g., non-uniform) power spectral density configuration such that beams which include low frequency components (e.g., beams emitted at large angles) may be transmitted at a higher power than beams which include high frequency components (e.g., beams emitted at smaller angles). For instances, a communication device may be configured via an RRC configuration indicating a power spectral density configuration for generating one or more beacon signals. In another example, a communication device may transmit multiple beacon signals where each beacon signal may correspond to a different range (e.g., a group) of frequencies. In some cases, beacon signals which correspond to a low frequency group may be transmitted at a higher power than beacon signals which correspond to a higher frequency group.

A communication device may receive a report (e.g., from another communication device) in response to transmitting one or more beacon signals. For example, a receiving node may report measurement results to the transmitting node (e.g., device). In some cases, the measurements may be for the same serving node (e.g., as part of a beam management or beam training process), and in some other cases, the measurements may be associated with neighboring nodes (e.g., for radio resource management (RRM) and mobility management). The report may indicate information associated with one or more transmitted beacon signals. In some examples, the report may indicate one or more emission angles (e.g., one or more angle of departures), one or more spectral signature identifiers, or one or more correlation receive signal strength indicators (RSSIs) that each correspond to a spectral signature identifier. For example, each correlation RSSI may indicate a power amplitude for each resource element occupied by a beacon signal. In some other examples, the report may indicate one or more sorted lists of angle of departures or one or more sorted lists of spectral signature identifiers. For example, the report may indicate an ordering of a list (e.g., set) of estimated angle of departures associated with the transmitted beacon signal. In such cases, the report may also indicate whether the list corresponds to a line of sight (LOS) or a non-line of sight (NLOS) path.

The report may indicate information associated with the peak frequency of one or more transmitted beacon signals. For example, the report may indicate a number of resource elements adjacent to the resource elements occupied by the peak amplitude (e.g., corresponding to the peak frequency). In some examples, the report may indicate an RSSI for resource elements occupied by the peak amplitude as well as an average RSSI for the resource elements adjacent to the resource elements occupied by the peak amplitude. In some other examples, the report may indicate a range of frequencies with the highest received signal strength. In other examples, transmitting a beacon signal via a leaky-wave antenna may reduce overhead related to beamforming processes and may improve communication between communication devices.

Aspects of the subject matter described herein may be implemented to realize one or more advantages. The described techniques may support improvements in wireless communications systems by reducing signaling overhead related to beamforming processes and may improve wireless communication between communication devices. In some examples, managing wireless communications for a leaky-wave antenna, as described herein, may support higher data rates, thereby improving latency and reliability. As such, supported techniques may include improved network operations, and, in some examples, may promote network efficiencies, among other benefits.

Aspects of the disclosure are initially described in the context of wireless communications systems. Aspects of the disclosure are further illustrated by and described with reference to apparatus diagrams, system diagrams, and flowcharts that relate to managing wireless communications for leaky-wave antennas.

FIG. 1 illustrates an example of a wireless communications system 100 that supports managing wireless communications for leaky-wave antennas in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a bandwidth part) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more bandwidth parts having the same or different numerologies. In some examples, a UE 115 may be configured with multiple bandwidth parts. In some examples, a single bandwidth part for a carrier may be active at a given time and communications for the UE 115 may be restricted to one or more active bandwidth parts.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support communications transmitted using a slotted waveguide (e.g., a leaky-wave antenna). Signals propagating through a leaky wave antenna experience different propagation channels such that the angle of emission (e.g., the angle at which the signal leaks into free space) is coupled to the frequency of the signal. For example, high frequency signals (e.g., approximately at 800 GHz) may emit at small angles (e.g., 10 degrees measured from the axis of the antenna) and low frequency signals (e.g., approximately 150 GHz) may emit at large angles (e.g., 80 degrees measured from the axis of the antenna). Accordingly, leaky-wave guides may be used for rainbow beamforming.

For example, injecting a wideband signal into a leaky-wave guide may provide coverage over a large spatial area with different portions of the wideband signal. As a result, signals may be emitted from a leak-wave antenna in multiple directions and each emitted signal may have a spectral signature (e.g., system response) with a peak amplitude that occurs at a frequency which is coupled to the angle at which the signal was emitted. In some cases, however, the spectral signatures of signals emitted at large angles (e.g., signals transmitted at low frequencies) may be narrow relative to the spectral signatures of signals emitted at small angles (e.g., signals transmitted at high frequencies). In such cases, the energy of signals emitted at large angles may be low and, accordingly, detection reliability at a receiving device (e.g., a UE 115 or a base station 105) may be low.

The wireless communications system 100 may support one or more aspects of managing wireless communications for leaky-wave antennas. For example, a communication device (e.g., a UE 115 or a base station 105) may generate a beacon signal based on a nonuniform power spectral density configuration. In some cases, the communication device may transmit control signaling, to one or more other communication device (e.g., one or more other UEs 115 or one or more other base stations 105), indicating a nonuniform power spectral density profile associated with the beacon signal. In some examples, the nonuniform power spectral density profile may indicate a respective power offset associated with the beacon signal for one or more subsets of resource elements of a set of resource elements. In some cases, the communication device may then transmit the beacon signal to the one or more other communication devices.

Figure 2:
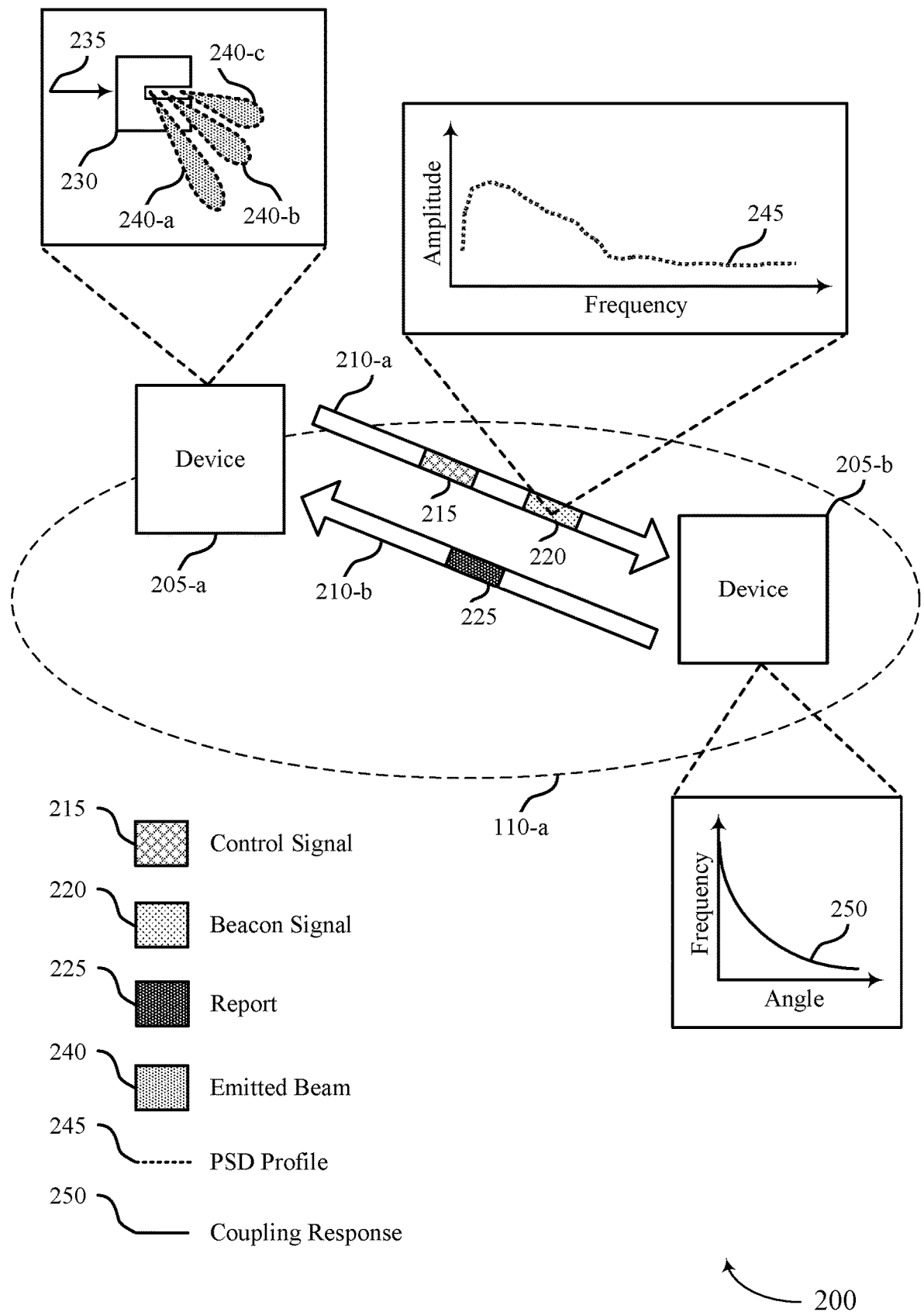

FIG. 2 illustrates an example of a wireless communications system 200 that supports managing wireless communications for leaky-wave antennas in accordance with aspects of the present disclosure. The wireless communications system 200 may implement or be implemented by one or more aspects of the wireless communications system 100. For example, the wireless communications system 200 may include a device 205-a and a device 205-b, which may be examples of devices as discussed with reference to FIG. 1. In the example of FIG. 2, the device 205-a may be a transmitting communication device (e.g., a base station 105 or a UE 115), while the device 205-b may be a receiving communication device (e.g., a base station 105 or a UE 115). The device 205-a and the device 205-b may support wired or wireless communication within a geographic coverage area 110-a which may be an example of a geographic coverage area 110 described with reference to FIG. 1.

The device 205-a may transmit one or more signals to the device 205-b via a communication link 210-a and the device 205-b may transmit one or more signals to the device 205-a via a communication link 210-b. In some cases, the communication links 210 may be examples of an access link, a sidelink, or a wireless backhaul link. In some examples, the devices 205 may communicate with one or more other devices 205 via one or more other communication links. The wireless communications system 200 may support managing wireless communications for leaky-wave antennas.

In the example of FIG. 2, one or more of the device 205-a or the device 205-b may transmit one or more signals using a leaky-wave antenna. In some cases, a leaky-wave antenna may be an example of a waveguide (e.g., a slotted waveguide) with a narrow slot open in one side. In some examples, a slotted waveguide may be an apparatus which includes parallel plates (e.g., metal plates) separated by a distance and a narrow slot (e.g., opening) that extends from one side of one plate. As such, traveling waves may leak energy out into the free space and different frequency components may emit at different angles (e.g., higher frequencies may emit at smaller angles). Stated alternatively, wave propagating through a leaky-wave antenna may experience different propagation channels such that the angle of emission may be coupled to the frequency of the signal. In some cases, signals (e.g., beams) may emit from a leaky-wave antenna according to an angle-frequency coupling response, such as a coupling response 250. As such, higher frequency waves (e.g., signals around 800 GHz) may emit at smaller angles (e.g., angles around 10 degrees measured from the axis of the leaky-wave antenna) and lower frequency waves (e.g., signals around 150 GHz) may emit at larger angles (e.g., angles around 80 degrees measured from the axis of the leaky-wave antenna). In some examples, leaky-wave antennas may be used for directional beamforming. In some cases, beamforming via a leaky-wave antenna may be referred to as rainbow beamforming and the multiple emitted beams may be collectively referred to as a rainbow beam.

A rainbow beam may be created in a one-shot transmission and a large spatial area may be covered with different portions of the wideband signal. For example, one or more of the device 205-*a* or the device 205-*b* may inject a wideband signal (e.g., a wideband signal 235) into a leaky-wave antenna (e.g., a leaky-wave antenna 230) to transmit multiple beams that cover a large spatial area. That is, a broadband source may generate a terahertz (THz) pulse which may be injected into the leaky-wave antenna. In some cases, the emitted beams (e.g., an emitted beam 240-*a*, an emitted beam 240-*b*, and an emitted beam 240-*c*) may each correspond to a different portion of frequency components included in the wideband signal 235. For example, the emitted beam 240-*a* may correspond to low frequency components and the emitted beam 240-*c* may correspond to high frequency components.

The effective half-power angular width (e.g., the angular width of the beam at half the peak power) and the effective half-power bandwidth (e.g., the frequency bandwidth of the beam at half the peak power) of emitted beams may depend on the angle at which each beam is emitted (e.g., the angle of departure). In some cases, the half-power bandwidth may also depend on the slot width of the leaky-wave antenna. In some examples, one or more of the device 205-*a* or the device 205-*b* may detect different spectral signatures (e.g., different power spectral density profiles) based on the angular region in which one or more of the device 205-*a* or the device 205-*b* is located (e.g., relative to the leaky-wave antenna). Stated alternatively, each angular region may correspond to a respective spectral signature. In some cases, the effective half-power bandwidth of beams emitted at large angles (e.g., angles greater than 50 degrees measured from the axis of the leaky-wave antenna) may be reduced compared to beams emitted at small angles. As such, the power spectral density profile of beams emitted at large angles (e.g., beams including low frequency components) may be narrow relative to the power spectral density profiles of beams emitted at small angles (e.g., beams including high frequency components). Stated alternatively, at large angles, the effective half-power bandwidth may shrink such that a monitoring device (e.g., one or more of the device 205-*a* or the device 205-*b*) at the corresponding angle may identify a narrow spectral signature. In such cases, the energy of signals emitted at large angles may be low and, therefore, detection reliability at one or more of the device 205-*a* or the device 205-*b* may be low. Stated alternatively, a receiving device may not collect enough energy for reliable detection.

To increase detection reliability, one or more of the device 205-*a* or the device 205-*b* may generate one or more signals such that low frequency components (e.g., beams emitted at large angles) may be transmitted at a higher power than higher frequency components (e.g., beams emitted at smaller angles). For example, the device 205-*a* may generate a beacon signal (e.g., a beacon signal 220) according to a nonuniform power spectral density configuration (e.g., with a non-flat power spectral density profile) such that the resource elements occupied by lower frequency components may be transmitted at a higher power than resource elements occupied by higher frequency components. In such cases, the device 205-*a* may transmit control signaling (e.g., a control signal 215) to indicate the power spectral profile (e.g., a power spectral density profile 245) associated with the beacon signal 220. In some examples, the control signal 215 may be a semi-static control signal (e.g., an RRC) and, in some other examples, the control signal 215 may be a dynamic control signal (e.g., a downlink control information (DCI), or a MAC-CE).

In some examples, the power spectral density profile 245 may indicate a respective power offset associated with the beacon signal 220 for one or more subsets of resource elements. For example, the device 205-*a* may transmit the beacon signal 220 at a first transmit power level for a first subset of resource elements and a second transmit power level for a second subset of resource elements. In some cases, the first subset of resource elements may include a first subset of frequencies and the second subset of resource elements may include a second subset of frequencies. In some other cases, the device 205-*a* may generate two or more beacon signals 220 (e.g., using time-division multiplexing), such that each beacon signal 220 may span a different portion of the available bandwidth (e.g., a different group of frequencies). In such cases, the total transmit power may be divided between each subset of resource elements occupied by the beacon signal 220. For example, a subset of resource elements occupied by a group of lower frequency components may be transmitted at a lower power than a subset of resource elements occupied by a group of higher frequency components. In some instances, the device 205-*a* may transmit control signal 215 in response to receiving capability information from the device 205-*b*. For example, the device 205-*b* may transmit capability information (e.g., via an RRC, a DCI, or a MAC-CE) to the device 205-*a* indicating support for a nonuniform power spectral density operation and, in response, the device 205-*a* may transmit the control signal 215.

The device 205-*a* may transmit the beacon signal 220 to the device 205-*b* via the communication link 210-*a*. In response to receiving the beacon signal 220, the device 205-*b* may transmit a report (e.g., a report 225) indicating information associated with the beacon signal 220. In some examples, the device 205-*b* may transmit the report 225 to the device 205-*a* via the communication link 210-*b*. In some cases, the report 225 may indicate one or more of a set of power signature identifiers associated with the beacon signal 220 (e.g., associated with the power spectral density profile 245). In some other cases, the report 225 may indicate a set of correlation RSSIs associated with the set of power signature identifiers.

In some instances, generating the beacon signal 220 according to a power spectral density configuration may increase detection reliability at a receiving device (e.g., the device 205-*b*), among other benefits.

Figure 3:
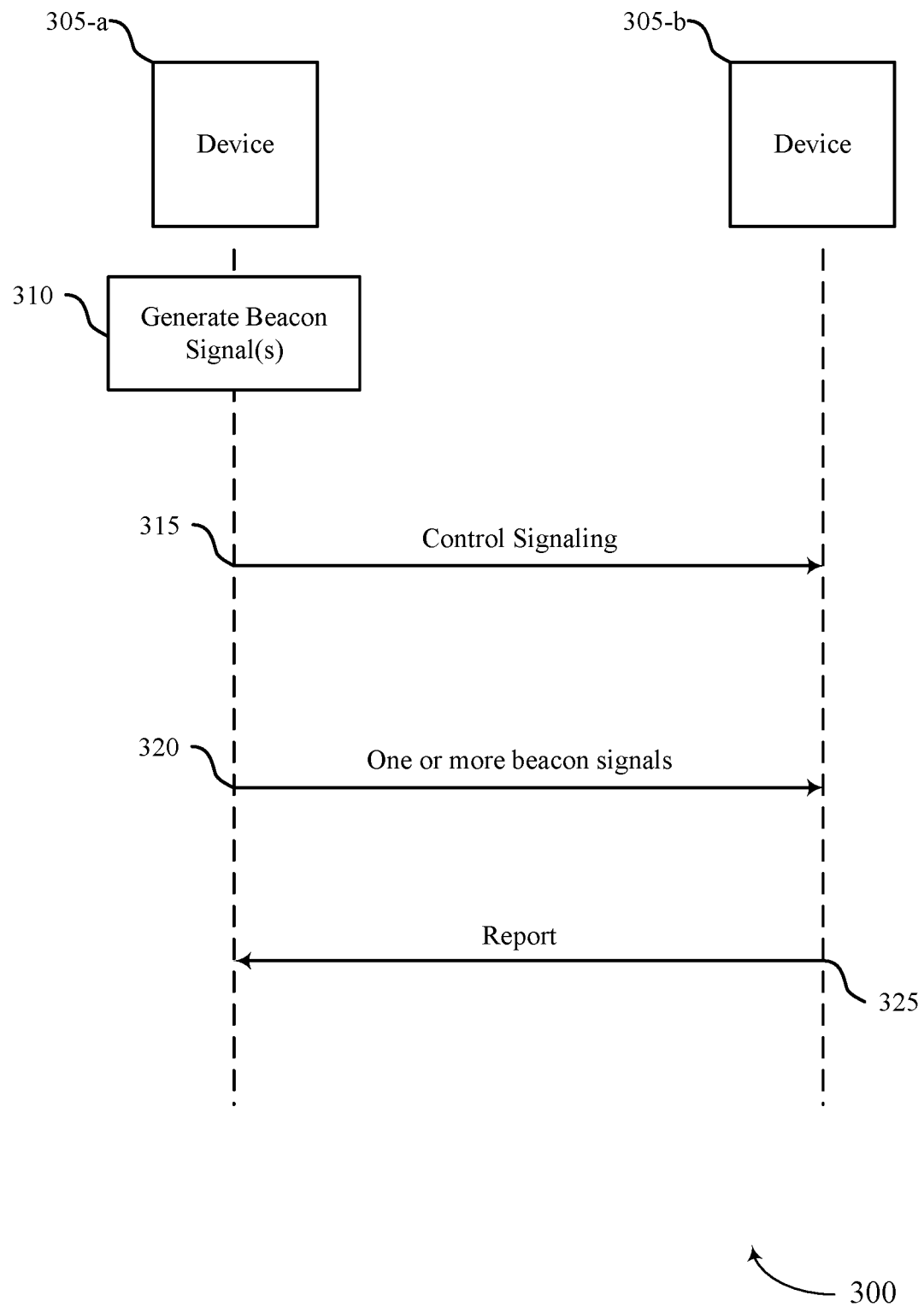
FIG. 3 illustrates an example of a process flow that supports managing wireless communications for leaky-wave antennas in accordance with aspects of the present disclosure.

FIG. 3 illustrates an example of a process flow 300 that supports managing wireless communications for leaky-wave antennas in accordance with aspects of the present disclosure. The process flow 300 may implement or be implemented by one or more aspects of the wireless communications system 100 and the wireless communications system 200. For example, the process flow 300 may include a device 305-*a* and a device 305-*b*, which may be examples of devices as discussed with reference to FIG. 1. In the example of FIG. 3, the device 305-*a* may be a transmitting communication device (e.g., a base station 105 or a UE 115), while the device 305-*b* may be a receiving communication device (e.g., a base station 105 or a UE 115). In the following description of the process flow 300, operations between the device 305-*a* and the device 305-*b* may occur in a different order or at different times than as shown. Some operations may also be omitted from the process flow 300, and other operations may be added to the process flow 300.

At 310, the device 305-*a* may generate one or more beacon signals for transmission using a leaky-wave antenna. In some examples, the device 305-*a* may generate a beacon signal according to a nonuniform power spectral density configuration such that one or more resource elements occupied by lower frequency components may be transmitted at a higher power than resource elements occupied by higher frequency components. In some other cases, the device 305-*a* may use time-division multiplexing to transmit two or more beacon signals, where each beacon signal may span a different portion of a bandwidth (e.g., may include a different group of frequencies components). In some cases, transmitting multiple beacon signals may enable sending lower frequencies with more power. For example, a subset of resource elements occupied by a group of lower frequency components may be transmitted at a lower power than a subset of resource elements occupied by a group of higher frequency components.

A bandwidth associated with the one or more generated beacon signals may be different. Stated alternatively, different beacons may have different bandwidths (e.g., non-uniformly split). For example, a bandwidth may be divided non-uniformly between each of the one or more generated beacon signals. For example, beacon signals spanning lower frequencies may have a shorter bandwidth and a higher energy per resource element (EPRE) than beacon signals spanning higher frequencies. In some cases, due to the non-linear angle-frequency coupling of a leaky-wave antenna, higher frequency signals (e.g., signals with small angle of departures) may travel a longer distance within the leaky-wave antenna than shorter frequency signals. As such, higher frequency signals may experience more attenuation than lower frequency signals. Stated alternatively, high frequency components may travel more distance within the leaky-wave antenna and, as such, the impact of non-linearities of the leaky-wave antenna may be more significant. In some cases, for example in the case of reflection, the higher frequency components may attenuate more. In such cases, the device 305-*a* may generate three or more beacon signals. For example, the device 305-*a* may generate a beacon signal for frequencies with small angle of departures (e.g., less than 20 degrees), a beacon signal for frequencies with intermediate angle of departures (e.g., greater than 20 degrees and less than 50 degrees), and a beacon signal for frequencies with large angle of departures (e.g., greater than 50 degrees and less than 90 degrees). In some cases, beacon signals with small angle of departures (e.g., beacon signals with high frequency components) and beacon signals with large angle of departures (e.g., beacon signals with low frequency components) may have narrower bandwidths than beacon signals with intermediate angle of departures.

One or more signals may be transmitted to indicate resources and configurations used to generate the one or more beacon signals. In some examples, resource and configuration information may be associated with the nonuniform power spectral density and may be shared with the monitoring or measuring node. For example, at 315, the device 305-*a* may transmit control signaling to the device 305-*b*. The device 305-*b* may be a communication device (e.g., a node) monitoring and measuring beacon signals. In some examples, the device 305-*a* may transmit control signaling to share (e.g., indicate) a non-uniform power spectral density profile associated with one or more beacon signals. For example, at 320, the device 305-*a* may transmit one or more beacon signals to the device 305-*b*. The device 305-*b* (e.g., a receiving communication device) may use information included in the control signaling to perform measurements (e.g., path loss estimation or transmit power control) on the one or more beacon signals.

The device 305-*b* may report measurement results to one or more other devices, such as the device 305-*a*. In some cases, measurement results may be transmitted to the device 305-*a*, which transmitted the one or more beacon signals. For example, at 325, the device 305-*b* may transmit a report to the device 305-*a*. In some cases, measurements may be reported to the device 305-*a* (e.g., a serving node) as part of a beam management or beam training operation. In some other cases, measurements may be reported to one or more other devices (e.g., one or more neighboring nodes, not shown). For example, measurements may be associated with neighboring nodes for RRM or mobility management operations.

In some examples, the device 305-*b* may be configured with one or more different spectral signature identifiers associated with one or more beacon signals (e.g., spectral signature identifiers associated with a power spectral density profile of the one or more beacon signals). Stated alternatively, spectral signature information may be provided to the receiving device such that the receiving device may know about different spectral signatures prior to receiving a beacon signal. For example, spectral signature identifiers may be configured by the device 305-*a* via control signaling. In such examples, the device 305-*b* may transmit at report indicating one or more estimated angle of departures or one or more spectral signature identifiers associated with a received beacon signal. In some cases, the report may indicate one or more sorted lists of angle of departures, or one or more sorted lists of spectral signature identifiers associated with a received beacon signal. In some instances, reports which indicate one or more sorted lists of angle of departures or one or more sorted lists of spectral signature identifiers, may also indicate whether the list corresponds to a LOS or a NLOS path between the device 305-*a* and the device 305-*b*. In some cases, the device 305-*b* may determine a path to be NLOS based on changes to the spectral signature identifiers of a received beacon signal.

Signal strength measurements such as RSSI and reference signal received power (RSRP) may be calculated based on correlating resource elements occupied by a detected signal with resource elements occupied by a reference signal. In other words, RSSI and RSRP measurements may depend on phase and amplitude information associated with a detected signal and a reference signal. However, in some instances, a received beacon signal may not be compared to a reference signal, that is, may not depend on phase information. Instead, a received beacon signal may be compared to one or more spectral signature identifiers and, as such, measurements may depend on amplitude information associated with the detected signal. Stated alternatively, measurements performed on beacon signals may depend on the amplitude of each resource element occupied by the received beacon signal. Therefore, in some cases, the device 305-*b* may report (e.g., in addition to estimated angle of departures or spectral signature identifiers) a confidence or strength metric associated with the reported angle of departures or power spectral density profiles. In some cases, the confidence or strength metric may be a correlation RSSI. In some other cases, the device 305-*b* may report the RSSI at the peak frequency or the RSSI in a window around the peak frequency.

The device 305-*b* may not be configured with spectral signature identifiers associated with one or more beacon signals. Stated alternatively, the receiving device may not know about different spectral signatures prior to receiving a beacon signal. In such examples, the device 305-*b* may report metrics such that the device 305-*a* may estimate spectral signature identifiers associated with the received beacon signal. In some cases, the device 305-*b* may transmit a report indicating information associated with the peak-frequency location. For example, the report may indicate a number of resource elements adjacent to the resource elements occupied by the peak amplitude (e.g., corresponding to the peak frequency). In some instances, the device 305-*b* may determine an adjacent resource element based on the resource element satisfying a threshold.

In other examples, the report may indicate an RSSI for resource elements occupied by the peak amplitude as well as an average RSSI for the resource elements adjacent to the resource elements occupied by the peak amplitude. That is, the report may indicate a signal strength for resource elements occupied by the peak amplitude as well as a relative strength for resource elements within a window adjacent to the resource elements occupied by the peak amplitude. In some other examples, the report may indicate one or more of angle of departures or frequency regions for one or more clusters (e.g., groups) of resource elements associated with the beacon signal. For example, the report may indicate a range of frequencies with the highest received signal strength (e.g., energy). In some cases, the report may indicate a frequency minimum and a frequency maximum that capture most of the received energy. In some cases, such as multipath transmissions, the device may provide multiple clusters of resource elements and associated metrics to different paths, angles, or frequency regions. For instance, the device 305-*b* may indicate multiple groups of resource elements associated with the determined metrics. For example, the report may include multiple groups of resource elements associated with different paths, different angle of departures, or different frequency regions of the detected beacon signal.

Figure 4:
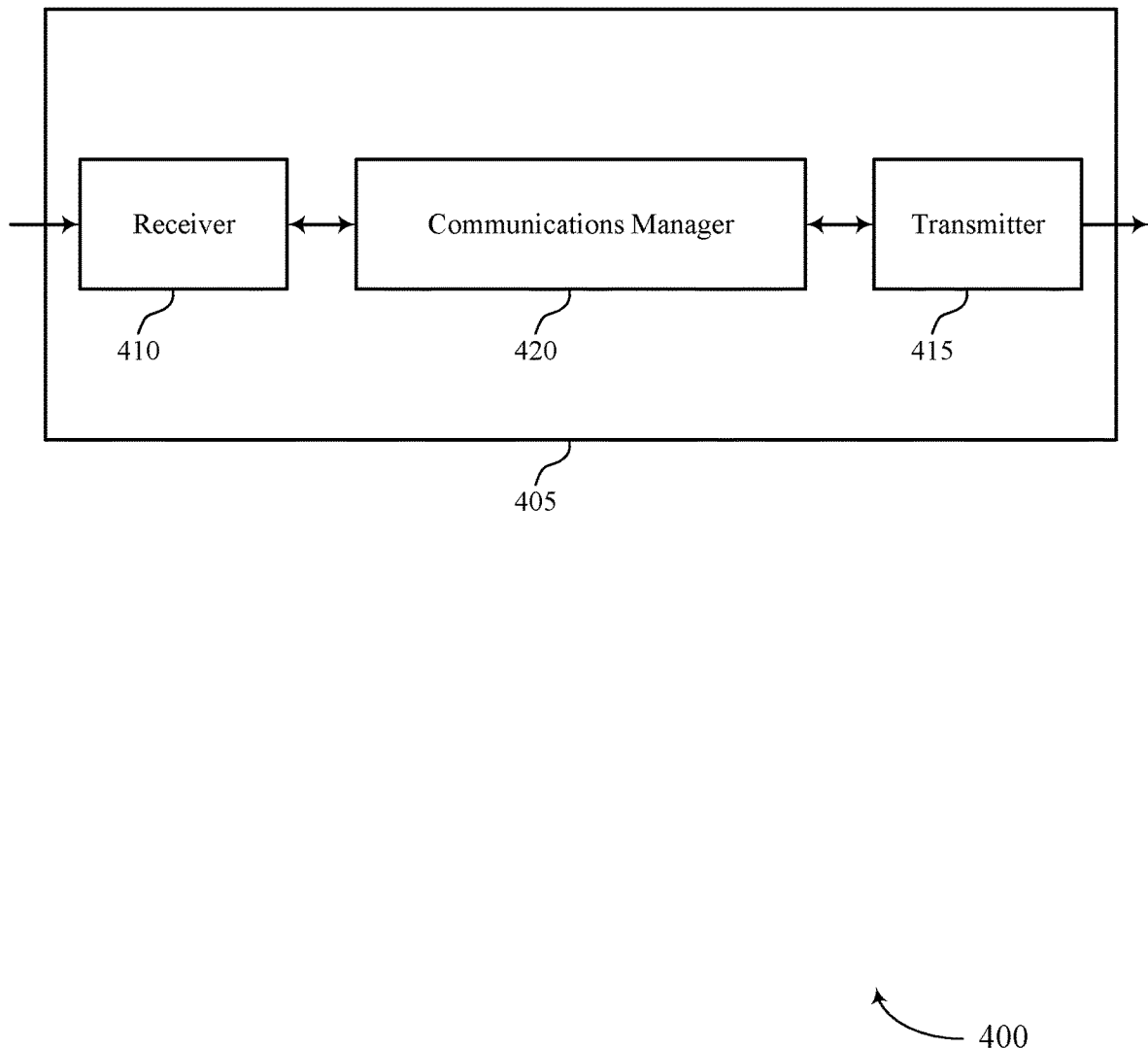
FIGS. 4 and 5 show block diagrams of devices that support managing wireless communications for leaky-wave antennas in accordance with aspects of the present disclosure.

FIG. 4 shows a block diagram 400 of a device 405 that supports managing wireless communications for leaky-wave antennas in accordance with aspects of the present disclosure. The device 405 may be an example of aspects of a device (e.g., a base station 105 or a UE 115) as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to managing wireless communications for leaky-wave antennas). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to managing wireless communications for leaky-wave antennas). In some examples, the transmitter 415 may be co-located with a receiver 410 in a transceiver. The transmitter 415 may utilize a single antenna or a set of multiple antennas.

The communications manager 420, the receiver 410, the transmitter 415, or various combinations thereof or various components thereof may be examples of means for performing various aspects of managing wireless communications for leaky-wave antennas as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at the device 405 in accordance with examples as disclosed herein. For example, the communications manager 420 may be configured as or otherwise support a means for generating a beacon signal based on a nonuniform power spectral density configuration. The communications manager 420 may be configured as or otherwise support a means for transmitting control signaling indicating a nonuniform power spectral density profile associated with the beacon signal, the nonuniform power spectral density profile indicating a respective power offset associated with the beacon signal for one or more subset of resource elements of a set of resource elements. The communications manager 420 may be configured as or otherwise support a means for transmitting the beacon signal. Additionally or alternatively, the communications manager 420 may be configured as or otherwise support a means for transmitting a beacon signal. The communications manager 420 may be configured as or otherwise support a means for receiving a report indicating one or more of a set of power signature identifiers associated with the beacon signal or a set of correlation received signal strength indicators associated with the set of power signature identifiers.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced power consumption.

Figure 5:
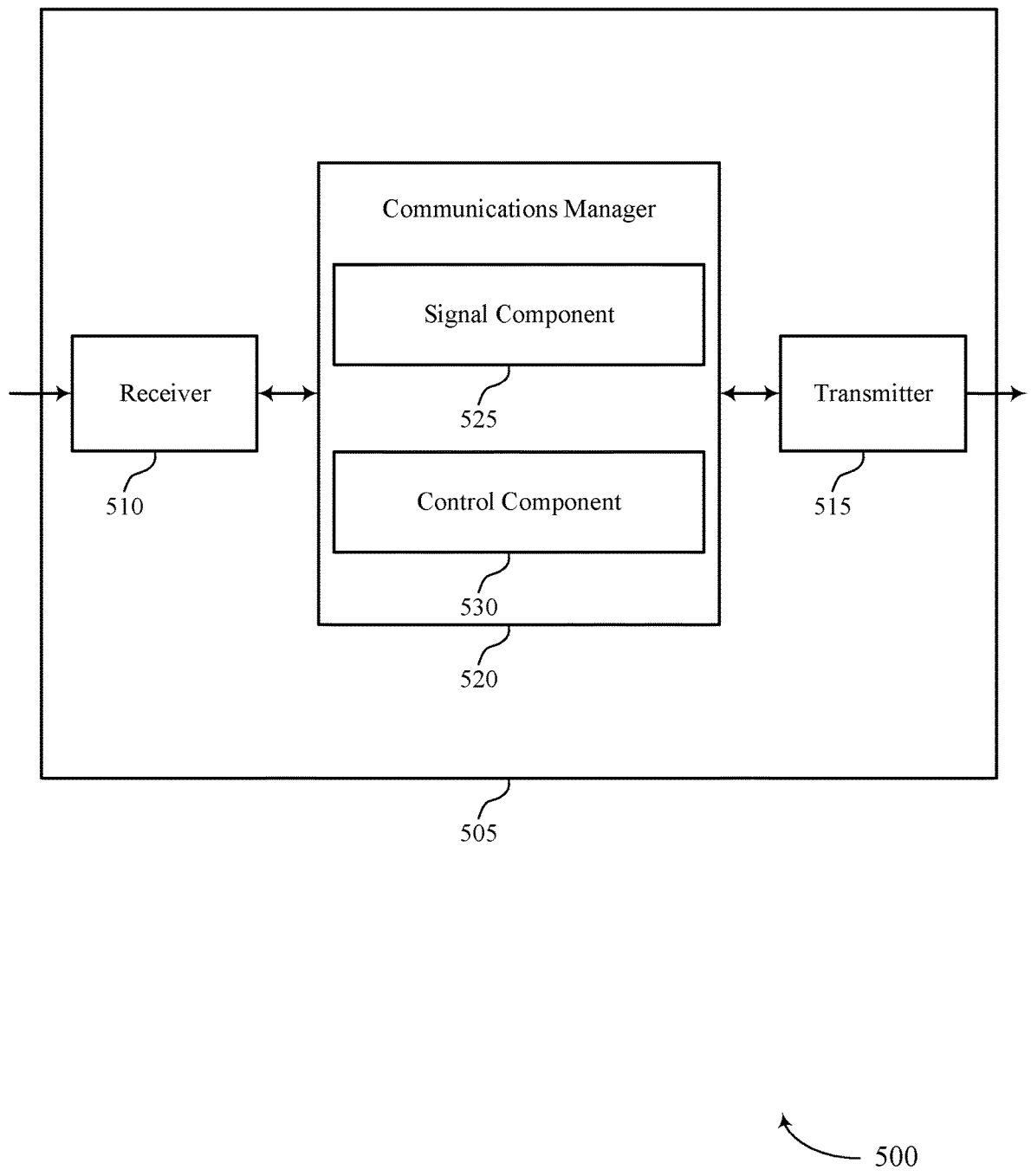

FIG. 5 shows a block diagram 500 of a device 505 that supports managing wireless communications for leaky-wave antennas in accordance with aspects of the present disclosure. The device 505 may be an example of aspects of a device 405 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to managing wireless communications for leaky-wave antennas). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to managing wireless communications for leaky-wave antennas). In some examples, the transmitter 515 may be co-located with a receiver 510 in a transceiver. The transmitter 515 may utilize a single antenna or a set of multiple antennas.

The device 505, or various components thereof, may be an example of means for performing various aspects of managing wireless communications for leaky-wave antennas as described herein. For example, the communications manager 520 may include a signal component 525 a control component 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 in accordance with examples as disclosed herein. The signal component 525 may be configured as or otherwise support a means for generating a beacon signal based on a nonuniform power spectral density configuration. The control component 530 may be configured as or otherwise support a means for transmitting control signaling indicating a nonuniform power spectral density profile associated with the beacon signal, the nonuniform power spectral density profile indicating a respective power offset associated with the beacon signal for one or more subset of resource elements of a set of resource elements. The signal component 525 may be configured as or otherwise support a means for transmitting the beacon signal. Additionally or alternatively, the signal component 525 may be configured as or otherwise support a means for transmitting a beacon signal. The control component 530 may be configured as or otherwise support a means for receiving a report indicating one or more of a set of power signature identifiers associated with the beacon signal or a set of correlation received signal strength indicators associated with the set of power signature identifiers.

Figure 6:
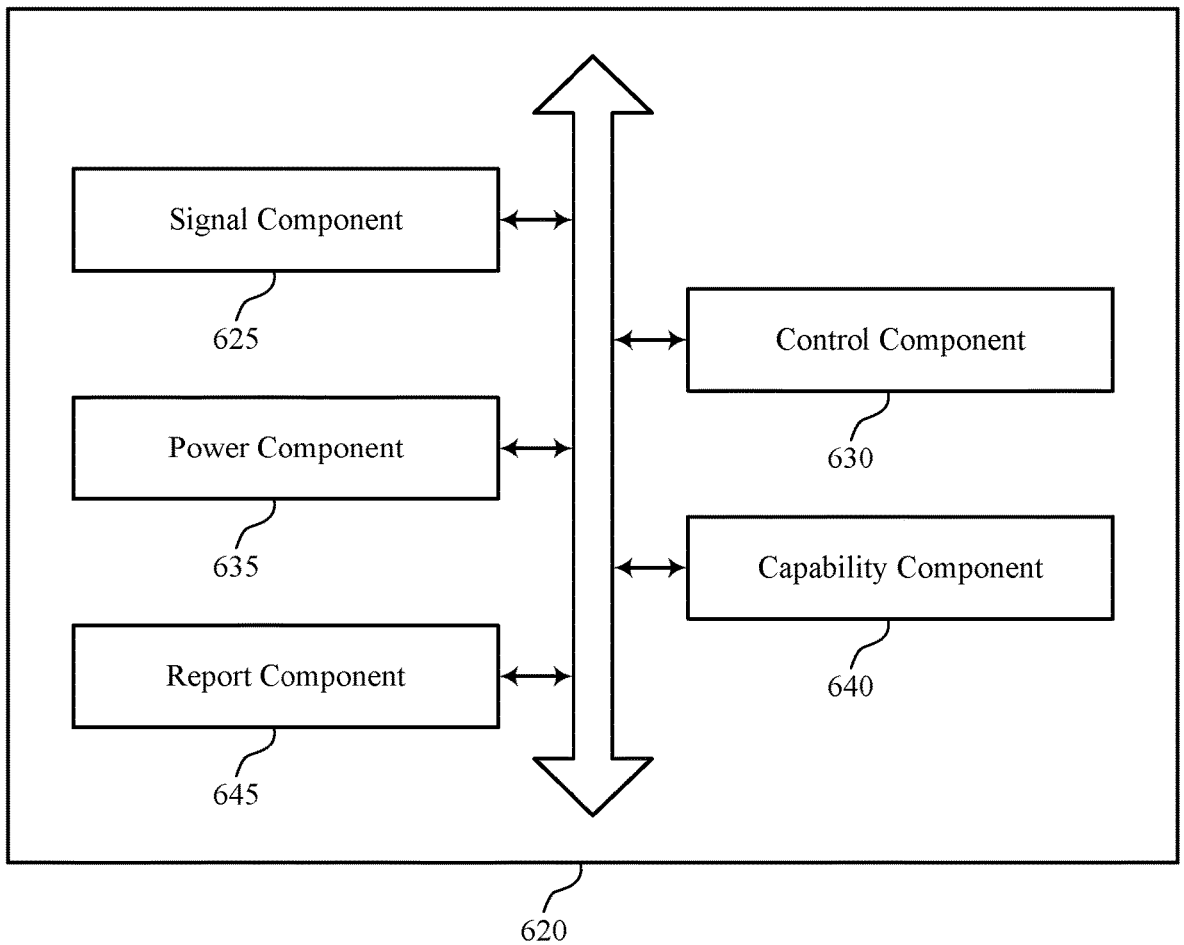
FIG. 6 shows a block diagram of a communications manager that supports managing wireless communications for leaky-wave antennas in accordance with aspects of the present disclosure.

FIG. 6 shows a block diagram 600 of a communications manager 620 that supports managing wireless communications for leaky-wave antennas in accordance with aspects of the present disclosure. The communications manager 620 may be an example of aspects of a communications manager 420, a communications manager 520, or both, as described herein. The communications manager 620, or various components thereof, may be an example of means for performing various aspects of managing wireless communications for leaky-wave antennas as described herein. For example, the communications manager 620 may include a signal component 625, a control component 630, a power component 635, a capability component 640, a report component 645, or any combination thereof. Each of these components may communicate, directly or indirectly, with one another (e.g., via one or more buses).

The communications manager 620 may support wireless communication at a device in accordance with examples as disclosed herein. The signal component 625 may be configured as or otherwise support a means for generating a beacon signal based on a nonuniform power spectral density configuration. The control component 630 may be configured as or otherwise support a means for transmitting control signaling indicating a nonuniform power spectral density profile associated with the beacon signal, the nonuniform power spectral density profile indicating a respective power offset associated with the beacon signal for one or more subset of resource elements of a set of resource elements. In some examples, the signal component 625 may be configured as or otherwise support a means for transmitting the beacon signal.

In some examples, to support transmitting the beacon signal, the power component 635 may be configured as or otherwise support a means for transmitting, based on the nonuniform power spectral density configuration, the beacon signal at a first transmit power level for a first subset of resource elements of the set of resource elements and a second transmit power level for a second subset of resource elements of the set of resource elements. In some examples, the first subset of resource elements includes a first subset of frequencies of a set of frequencies and the second subset of resource elements includes a second subset of frequencies of the set of frequencies.

In some examples, to support transmitting the beacon signal, the first subset of resource elements and the second subset of resource elements may be associated with different time-domain resources and the signal component 625 may be configured as or otherwise support a means for transmitting the beacon signal based on time-division multiplexing the first subset of resource elements and the second subset of resource elements. In some examples, the control component 630 may be configured as or otherwise support a means for transmitting second control signaling indicating a second nonuniform power spectral density profile associated with the second subset of resource elements, the second nonuniform power spectral density profile indicating a respective power offset associated with the second subset of resource elements.

In some examples, the first subset of resource elements signal spans a first bandwidth part of a bandwidth and the second subset of resource elements spans a second bandwidth part of the bandwidth. In some examples, a first total transmit power level is split between each resource element of the first subset of resource elements and a second total transmit power level is split between each resource element of the second subset of resource elements.

In some examples, the capability component 640 may be configured as or otherwise support a means for transmitting capability information indicating support for nonuniform power spectral density operation. In some examples, the control component 630 may be configured as or otherwise support a means for receiving second control signaling indicating the nonuniform power spectral density configuration based on the capability information. In some examples, the second control signaling includes semi-static control signaling including RRC signaling, or dynamic control signaling including a DCI or a MAC-CE.

Additionally or alternatively, the signal component 625 may be configured as or otherwise support a means for transmitting a beacon signal. In some examples, the report component 645 may be configured as or otherwise support a means for receiving a report indicating one or more of a set of power signature identifiers associated with the beacon signal or a set of correlation RSSIs associated with the set of power signature identifiers. In some examples, each correlation RSSI indicates a power amplitude associated with the beacon signal for each resource element of the one or more subset of resource elements of the set of resource elements. In some examples, the report indicates a RSSI value for a peak power amplitude associated with the beacon signal for the one or more subset of resource elements of the set of resource elements.

In some examples, the report indicates an ordering of one or more of a set of estimated angle of departures associated with the beacon signal or the set of power signature identifiers. In some examples, the report indicates that one or more of a respective estimated angle of departure of a set of estimated angle of departures or a respective power signature identifier of the set of power signature identifiers corresponds to a LOS path or a NLOS path. In some examples, the report indicates a number of resource elements of the set of resource elements satisfying a power amplitude threshold, the number of resource elements of the set of resource elements neighboring a resource element corresponding to a peak power amplitude associated with the beacon signal.

In some examples, the report indicates one or more of a RSSI corresponding to a peak power amplitude associated with the beacon signal or an average RSSI corresponding to a number of resource elements of the set of resource elements neighboring a resource element corresponding to the peak power amplitude associated with the beacon signal. In some examples, the report indicates a range of frequencies associated with a peak power amplitude associated with the beacon signal. In some examples, the report indicates one or more of angle of departures or frequency regions for a set of multiple clusters of resource element associated with the beacon signal based on a multipath propagation of the beacon signal.

Figure 7:
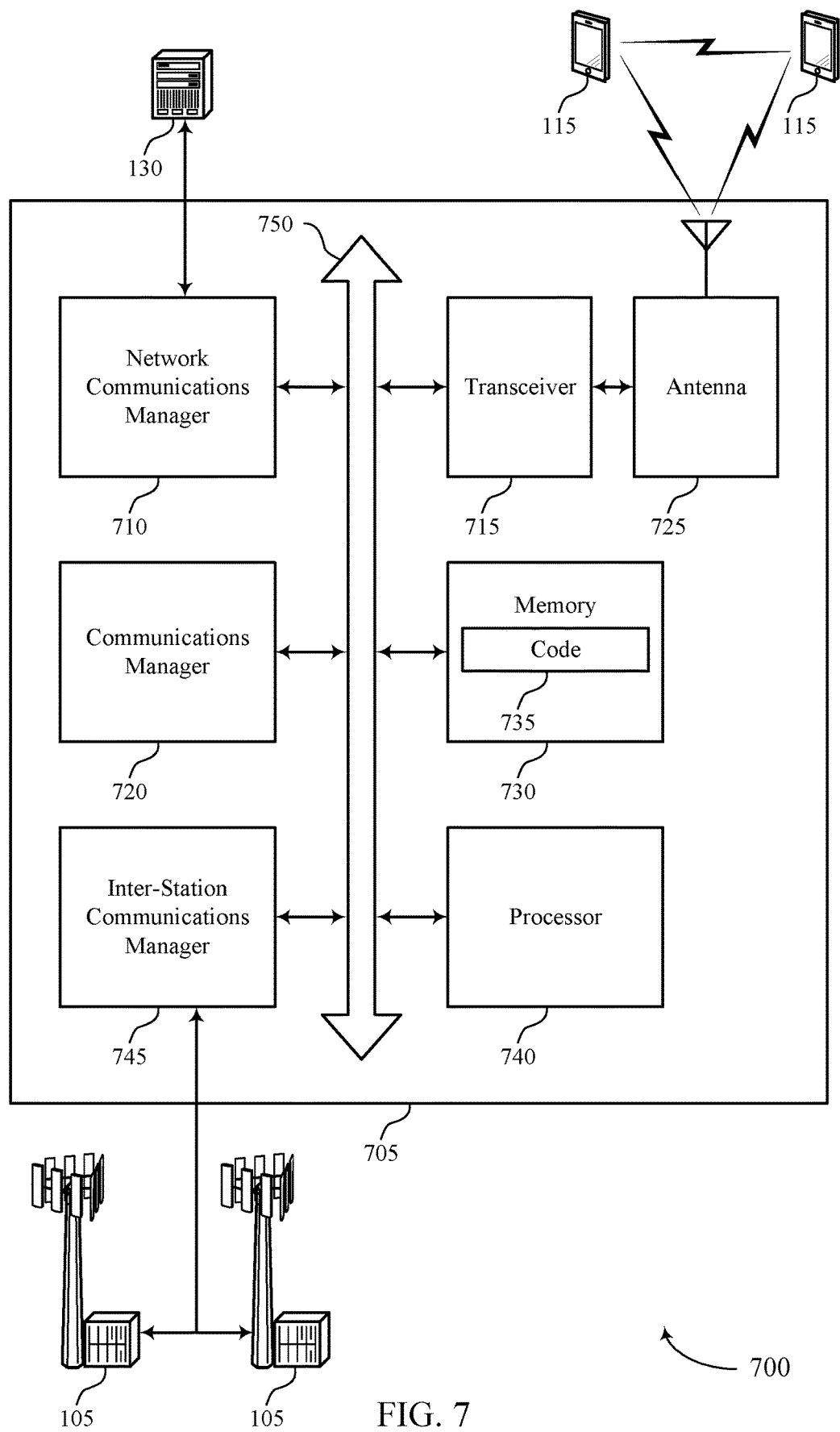
FIG. 7 shows a diagram of a system including a device that supports managing wireless communications for leaky-wave antennas in accordance with aspects of the present disclosure.

FIG. 7 shows a diagram of a system 700 including a device 705 that supports managing wireless communications for leaky-wave antennas in accordance with aspects of the present disclosure. The device 705 may be an example of or include the components of a device 405, a device 505, or a device (e.g., a base station 105 or a UE 115) as described herein. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic input/output system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting managing wireless communications for leaky-wave antennas). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communication at the device 705 in accordance with examples as disclosed herein. For example, the communications manager 720 may be configured as or otherwise support a means for generating a beacon signal based on a nonuniform power spectral density configuration. The communications manager 720 may be configured as or otherwise support a means for transmitting control signaling indicating a nonuniform power spectral density profile associated with the beacon signal, the nonuniform power spectral density profile indicating a respective power offset associated with the beacon signal for one or more subset of resource elements of a set of resource elements. The communications manager 720 may be configured as or otherwise support a means for transmitting the beacon signal. Additionally or alternatively, the communications manager 720 may be configured as or otherwise support a means for transmitting a beacon signal. The communications manager 720 may be configured as or otherwise support a means for receiving a report indicating one or more of a set of power signature identifiers associated with the beacon signal or a set of correlation received signal strength indicators associated with the set of power signature identifiers. By including or configuring the communications manager 720 in accordance with examples as described herein, the device 705 may support techniques for improved communication reliability, reduced latency, and more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of managing wireless communications for leaky-wave antennas as described herein, or the processor 740 and the memory 730 may be otherwise configured to perform or support such operations.

Figure 8:
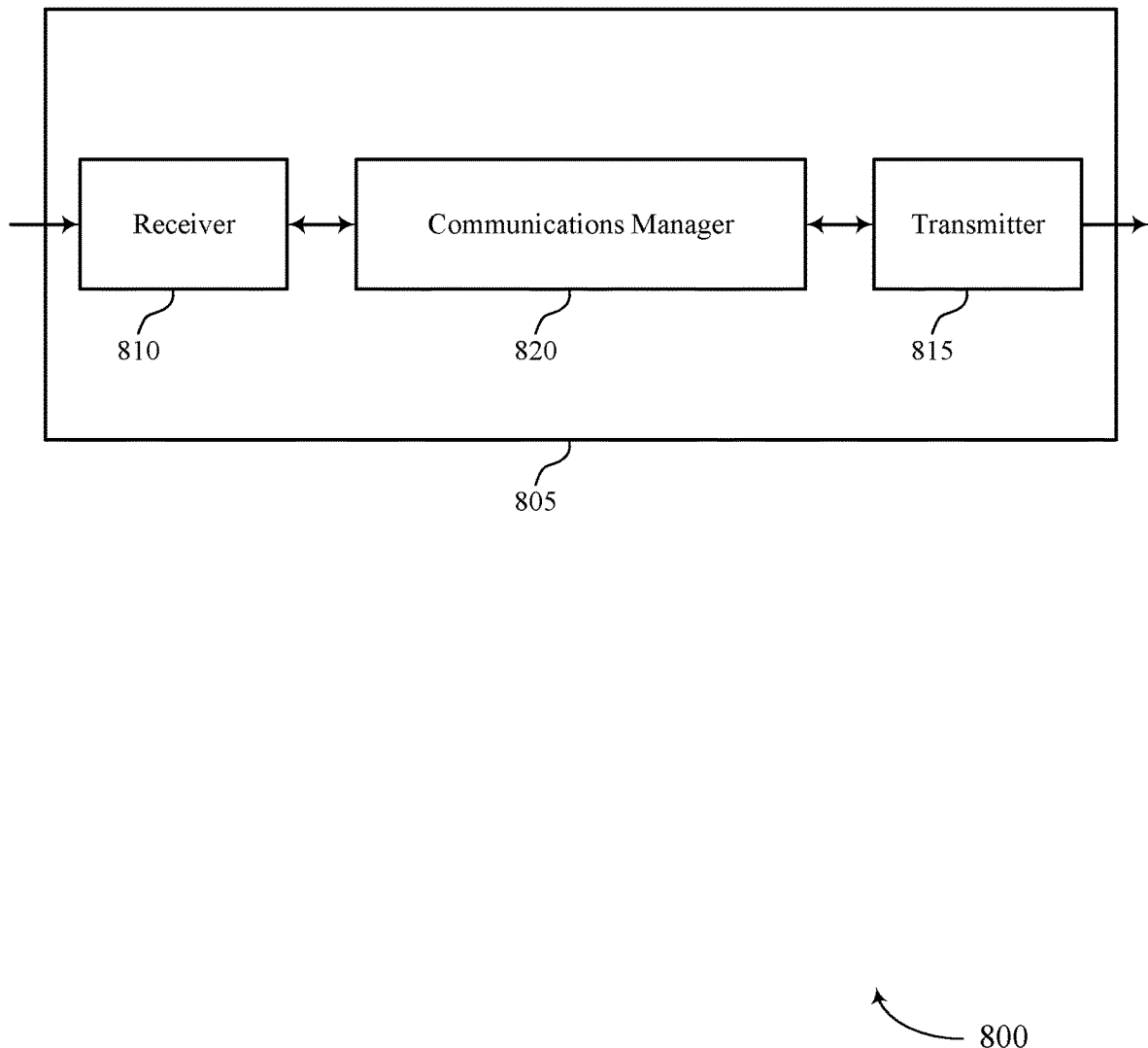
FIGS. 8 and 9 show block diagrams of devices that support managing wireless communications for leaky-wave antennas in accordance with aspects of the present disclosure.

FIG. 8 shows a block diagram 800 of a device 805 that supports managing wireless communications for leaky-wave antennas in accordance with aspects of the present disclosure. The device 805 may be an example of aspects of a device as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to managing wireless communications for leaky-wave antennas). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to managing wireless communications for leaky-wave antennas). In some examples, the transmitter 815 may be co-located with a receiver 810 in a transceiver. The transmitter 815 may utilize a single antenna or a set of multiple antennas.

The communications manager 820, the receiver 810, the transmitter 815, or various combinations thereof or various components thereof may be examples of means for performing various aspects of managing wireless communications for leaky-wave antennas as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at the device 805 in accordance with examples as disclosed herein. For example, the communications manager 820 may be configured as or otherwise support a means for receiving control signaling indicating a nonuniform power spectral density profile associated with a beacon signal, the nonuniform power spectral density profile indicating a respective power offset associated with the beacon signal for one or more subset of resource elements of a set of resource elements. The communications manager 820 may be configured as or otherwise support a means for receiving the beacon signal. Additionally or alternatively, the communications manager 820 may be configured as or otherwise support a means for receiving a beacon signal. The communications manager 820 may be configured as or otherwise support a means for transmitting a report indicating one or more of a set of power signature identifiers associated with the beacon signal or a set of correlation received signal strength indicators associated with the set of power signature identifiers.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption.

Figure 9:
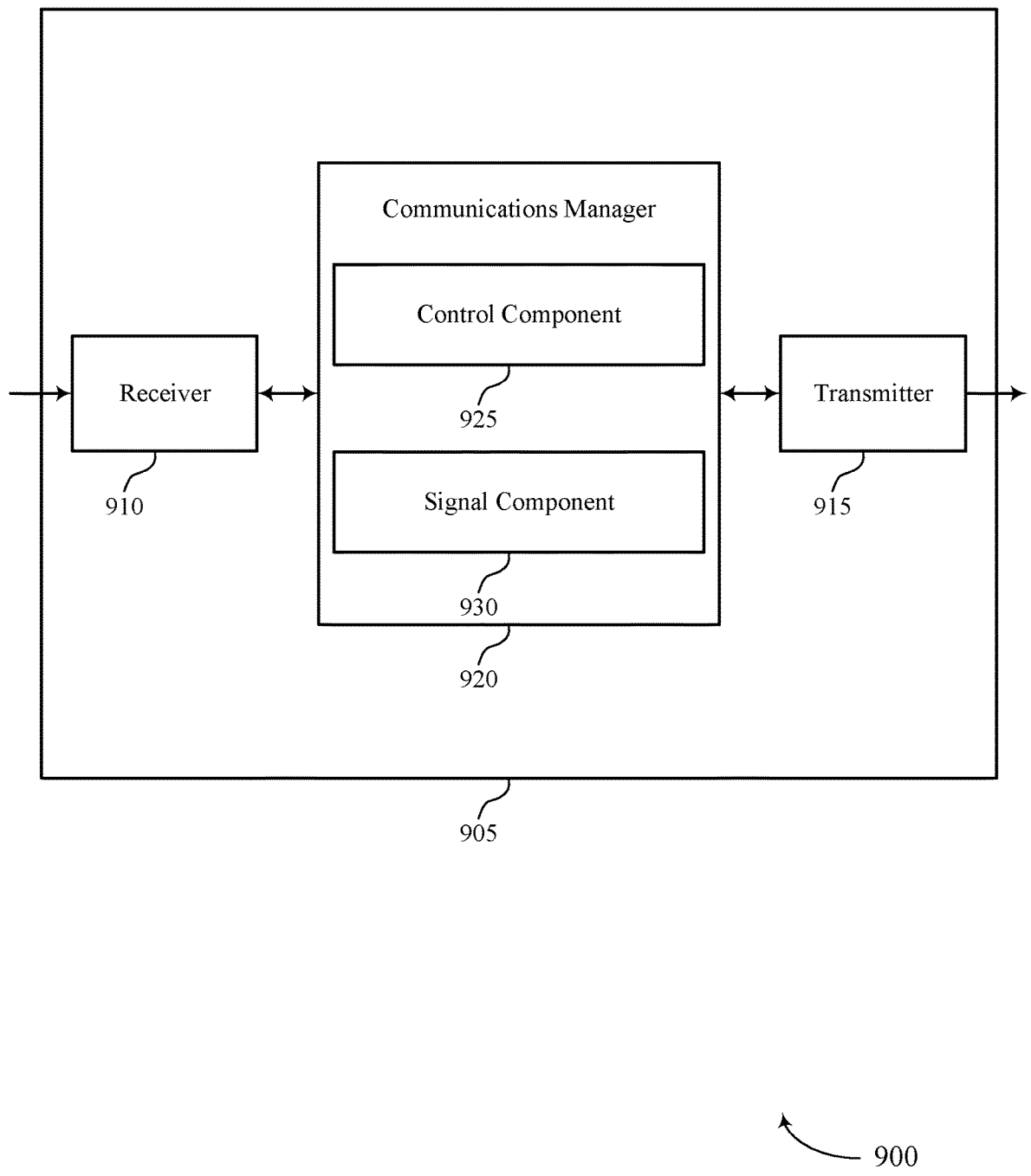

FIG. 9 shows a block diagram 900 of a device 905 that supports managing wireless communications for leaky-wave antennas in accordance with aspects of the present disclosure. The device 905 may be an example of aspects of a device 805 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to managing wireless communications for leaky-wave antennas). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to managing wireless communications for leaky-wave antennas). In some examples, the transmitter 915 may be co-located with a receiver 910 in a transceiver. The transmitter 915 may utilize a single antenna or a set of multiple antennas.

The device 905, or various components thereof, may be an example of means for performing various aspects of managing wireless communications for leaky-wave antennas as described herein. For example, the communications manager 920 may include a control component 925 a signal component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 in accordance with examples as disclosed herein. The control component 925 may be configured as or otherwise support a means for receiving control signaling indicating a nonuniform power spectral density profile associated with a beacon signal, the nonuniform power spectral density profile indicating a respective power offset associated with the beacon signal for one or more subset of resource elements of a set of resource elements. The signal component 930 may be configured as or otherwise support a means for receiving the beacon signal. Additionally or alternatively, the signal component 930 may be configured as or otherwise support a means for receiving a beacon signal. The control component 925 may be configured as or otherwise support a means for transmitting a report indicating one or more of a set of power signature identifiers associated with the beacon signal or a set of correlation received signal strength indicators associated with the set of power signature identifiers.

Figure 10:
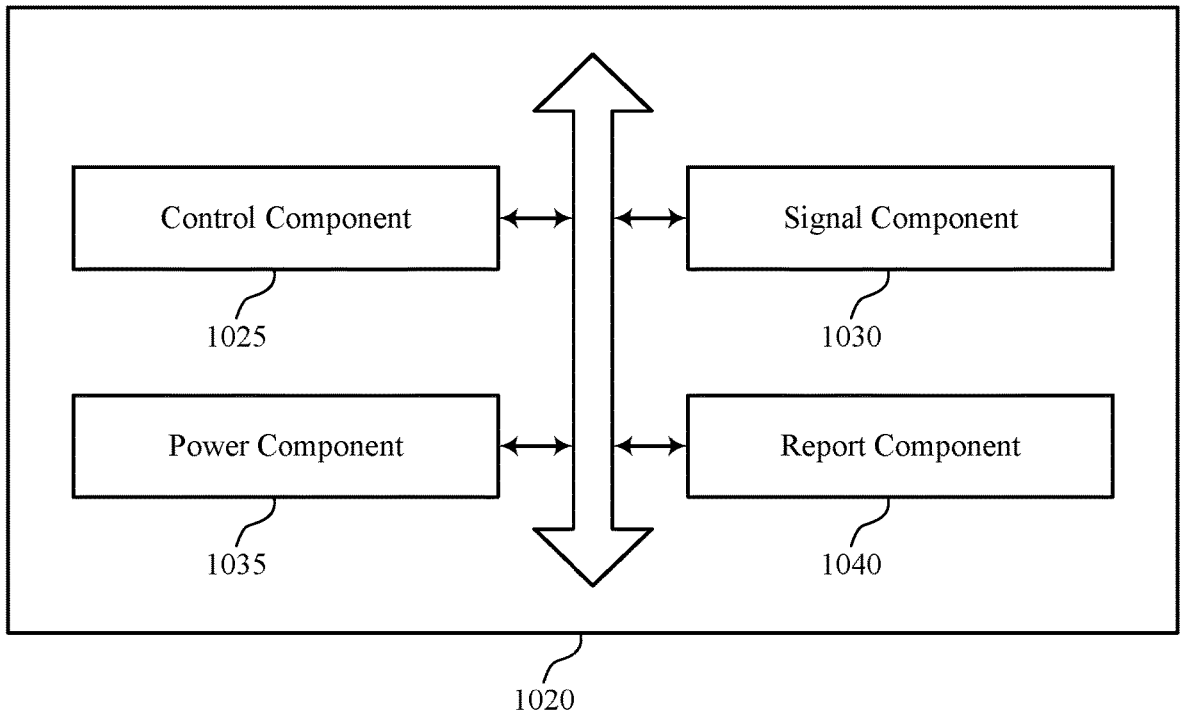
FIG. 10 shows a block diagram of a communications manager that supports managing wireless communications for leaky-wave antennas in accordance with aspects of the present disclosure.

FIG. 10 shows a block diagram 1000 of a communications manager 1020 that supports managing wireless communications for leaky-wave antennas in accordance with aspects of the present disclosure. The communications manager 1020 may be an example of aspects of a communications manager 820, a communications manager 920, or both, as described herein. The communications manager 1020, or various components thereof, may be an example of means for performing various aspects of managing wireless communications for leaky-wave antennas as described herein. For example, the communications manager 1020 may include a control component 1025, a signal component 1030, a power component 1035, a report component 1040, or any combination thereof. Each of these components may communicate, directly or indirectly, with one another (e.g., via one or more buses).

The communications manager 1020 may support wireless communication at a device in accordance with examples as disclosed herein. The control component 1025 may be configured as or otherwise support a means for receiving control signaling indicating a nonuniform power spectral density profile associated with a beacon signal, the nonuniform power spectral density profile indicating a respective power offset associated with the beacon signal for one or more subset of resource elements of a set of resource elements. The signal component 1030 may be configured as or otherwise support a means for receiving the beacon signal.

In some examples, to support receiving the beacon signal, the power component 1035 may be configured as or otherwise support a means for receiving, based on a nonuniform power spectral density configuration, the beacon signal at a first transmit power level for a first subset of resource elements of the set of resource elements and a second transmit power level for a second subset of resource elements of the set of resource elements. In some examples, the first subset of resource elements includes a first subset of frequencies of a set of frequencies and the second subset of resource elements includes a second subset of frequencies of the set of frequencies.

In some examples, to support receiving the beacon signal, the first subset of resource elements and the second subset of resource elements may be associated with different time-domain resources and the signal component 1030 may be configured as or otherwise support a means for receiving the beacon signal based on a time-division multiplexing of the first subset of resource elements and the second subset of resource elements. In some examples, the control component 1025 may be configured as or otherwise support a means for receiving second control signaling indicating a second nonuniform power spectral density profile associated with the second subset of resource elements. The second nonuniform power spectral density profile indicating a respective power offset associated with the second subset of resource elements. In some examples, the first subset of resource elements spans a first bandwidth part of a bandwidth and the second subset of resource elements spans a second bandwidth part of the bandwidth. In some examples, a first total transmit power level is split between each resource element of the first subset of resource elements and a second total transmit power level is split between each resource element of the second subset of resource elements.

Additionally or alternatively, the signal component 1030 may be configured as or otherwise support a means for receiving a beacon signal. In some examples, the report component 1040 may be configured as or otherwise support a means for transmitting a report indicating one or more of a set of power signature identifiers associated with the beacon signal or a set of correlation RSSIs associated with the set of power signature identifiers. In some examples, each correlation RSSI indicates a power amplitude associated with the beacon signal for each resource element of the one or more subset of resource elements of the set of resource elements. In some examples, the report indicates a RSSI value for a peak power amplitude associated with the beacon signal for the one or more subset of resource elements of the set of resource elements. In some examples, the report indicates an ordering of one or more of a set of estimated angle of departures associated with the beacon signal or the set of power signature identifiers. In some examples, the report indicates that one or more of a respective estimated angle of departure of a set of estimated angle of departures or a respective power signature identifier of the set of power signature identifiers corresponds to a LOS or a NLOS.

Figure 11:
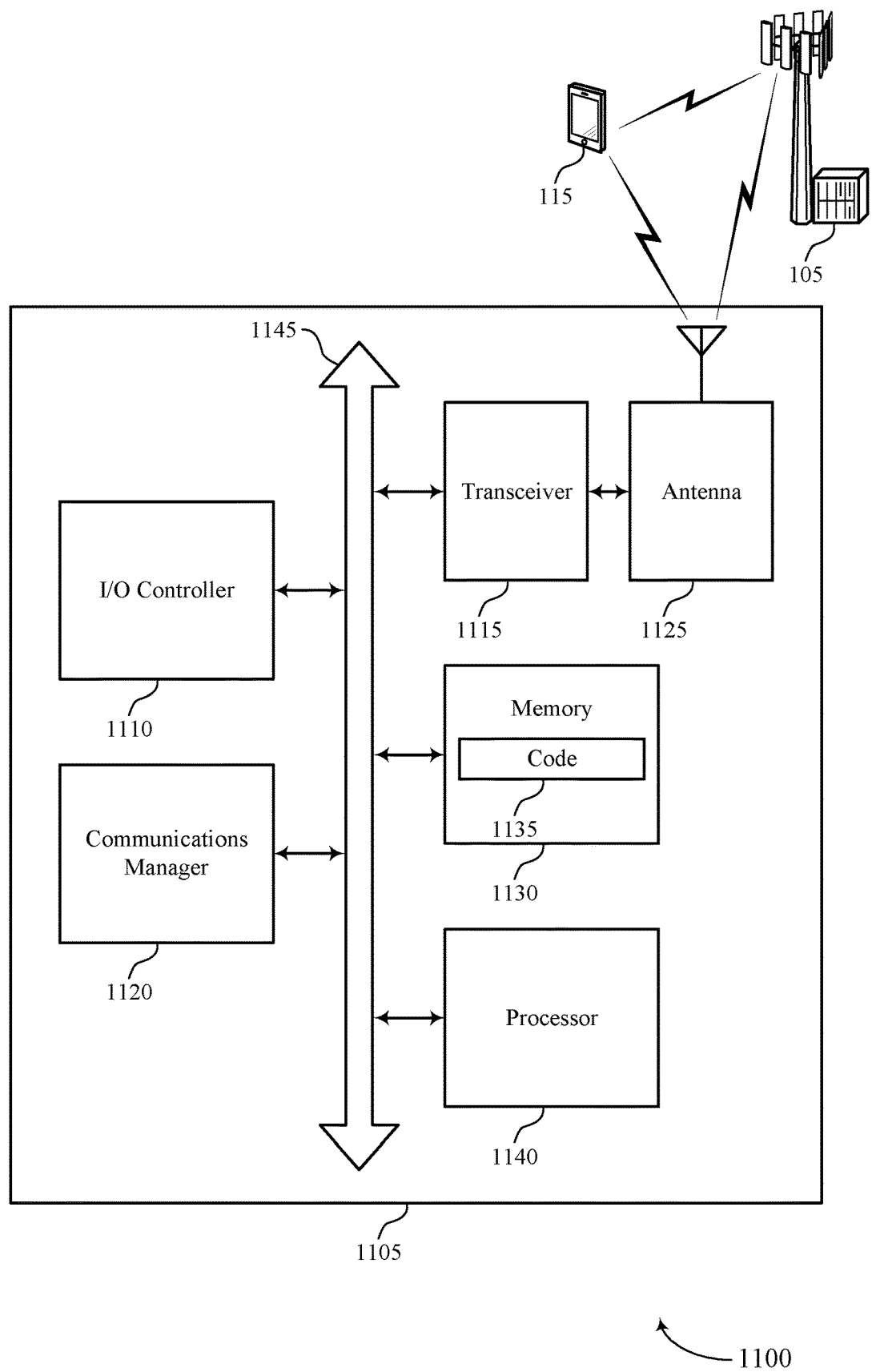
FIG. 11 shows a diagram of a system including a device that supports managing wireless communications for leaky-wave antennas in accordance with aspects of the present disclosure.

FIG. 11 shows a diagram of a system 1100 including a device 1105 that supports managing wireless communications for leaky-wave antennas in accordance with aspects of the present disclosure. The device 1105 may be an example of or include the components of a device 805, a device 905, or a device (e.g., a base station 105 or a UE 115) as described herein. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting managing wireless communications for leaky-wave antennas). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at the device 1105 in accordance with examples as disclosed herein. For example, the communications manager 1120 may be configured as or otherwise support a means for receiving control signaling indicating a nonuniform power spectral density profile associated with a beacon signal, the nonuniform power spectral density profile indicating a respective power offset associated with the beacon signal for one or more subset of resource elements of a set of resource elements. The communications manager 1120 may be configured as or otherwise support a means for receiving the beacon signal. Additionally or alternatively, the communications manager 1120 may be configured as or otherwise support a means for receiving a beacon signal.

The communications manager 1120 may be configured as or otherwise support a means for transmitting a report indicating one or more of a set of power signature identifiers associated with the beacon signal or a set of correlation received signal strength indicators associated with the set of power signature identifiers.

By including or configuring the communications manager 1120 in accordance with examples as described herein, the device 1105 may support techniques for improved communication reliability, reduced latency, reduced power consumption, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of managing wireless communications for leaky-wave antennas as described herein, or the processor 1140 and the memory 1130 may be otherwise configured to perform or support such operations.

Figure 12:
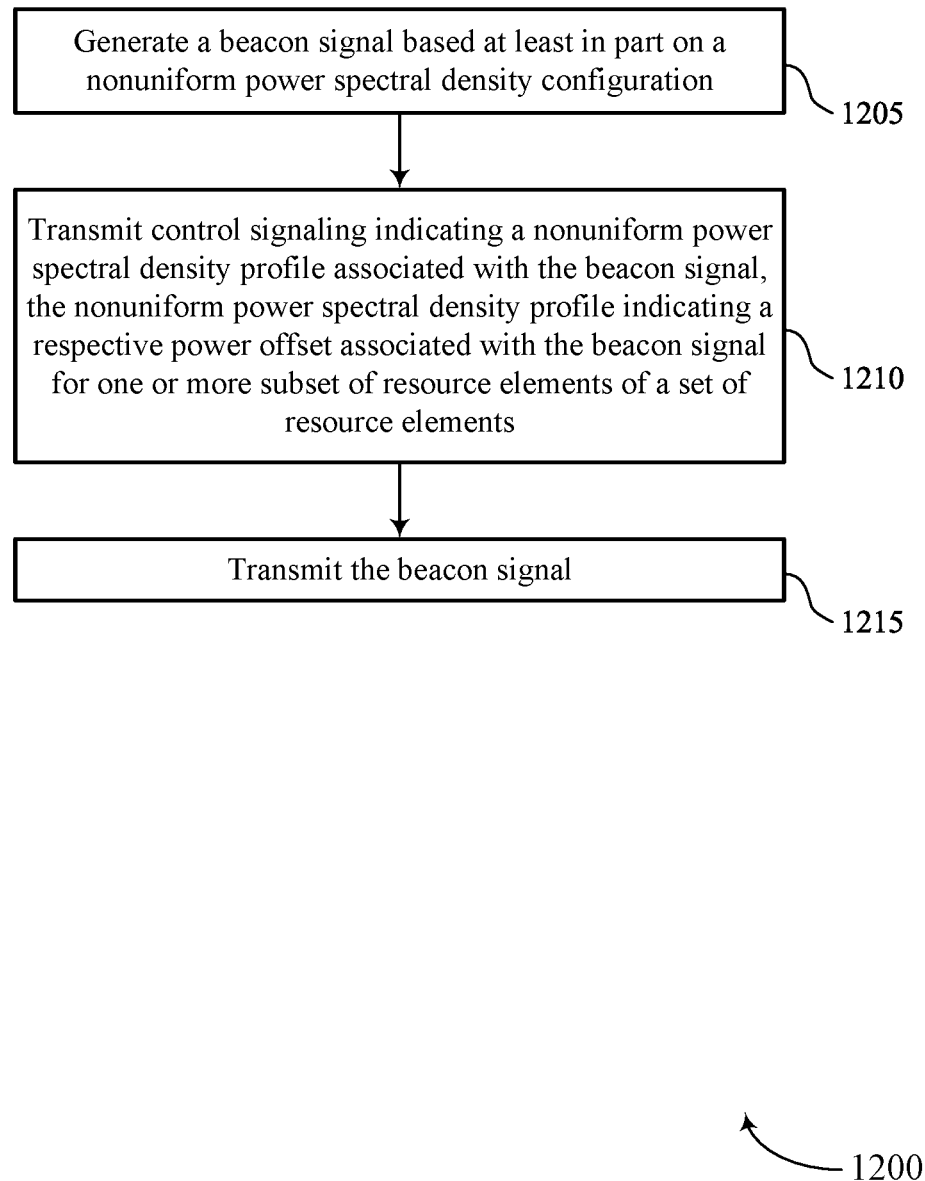
FIGS. 12 through 17 show flowcharts illustrating methods that support managing wireless communications for leaky-wave antennas in accordance with aspects of the present disclosure.

FIG. 12 shows a flowchart illustrating a method 1200 that supports managing wireless communications for leaky-wave antennas in accordance with aspects of the present disclosure. The operations of the method 1200 may be implemented by a device or its components as described herein. For example, the operations of the method 1200 may be performed by a device as described with reference to FIGS. 1 through 7. In some examples, a device may execute a set of instructions to control the functional elements of the device to perform the described functions. Additionally or alternatively, the device may perform aspects of the described functions using special-purpose hardware.

At 1205, the method may include generating a beacon signal based on a nonuniform power spectral density configuration. The operations of 1205 may be performed in accordance with examples as disclosed herein. In some examples, aspects of the operations of 1205 may be performed by a signal component 625 as described with reference to FIG. 6.

At 1210, the method may include transmitting control signaling indicating a nonuniform power spectral density profile associated with the beacon signal, the nonuniform power spectral density profile indicating a respective power offset associated with the beacon signal for one or more subset of resource elements of a set of resource elements. The operations of 1210 may be performed in accordance with examples as disclosed herein. In some examples, aspects of the operations of 1210 may be performed by a control component 630 as described with reference to FIG. 6.

At 1215, the method may include transmitting the beacon signal. The operations of 1215 may be performed in accordance with examples as disclosed herein. In some examples, aspects of the operations of 1215 may be performed by a signal component 625 as described with reference to FIG. 6.

Figure 13:
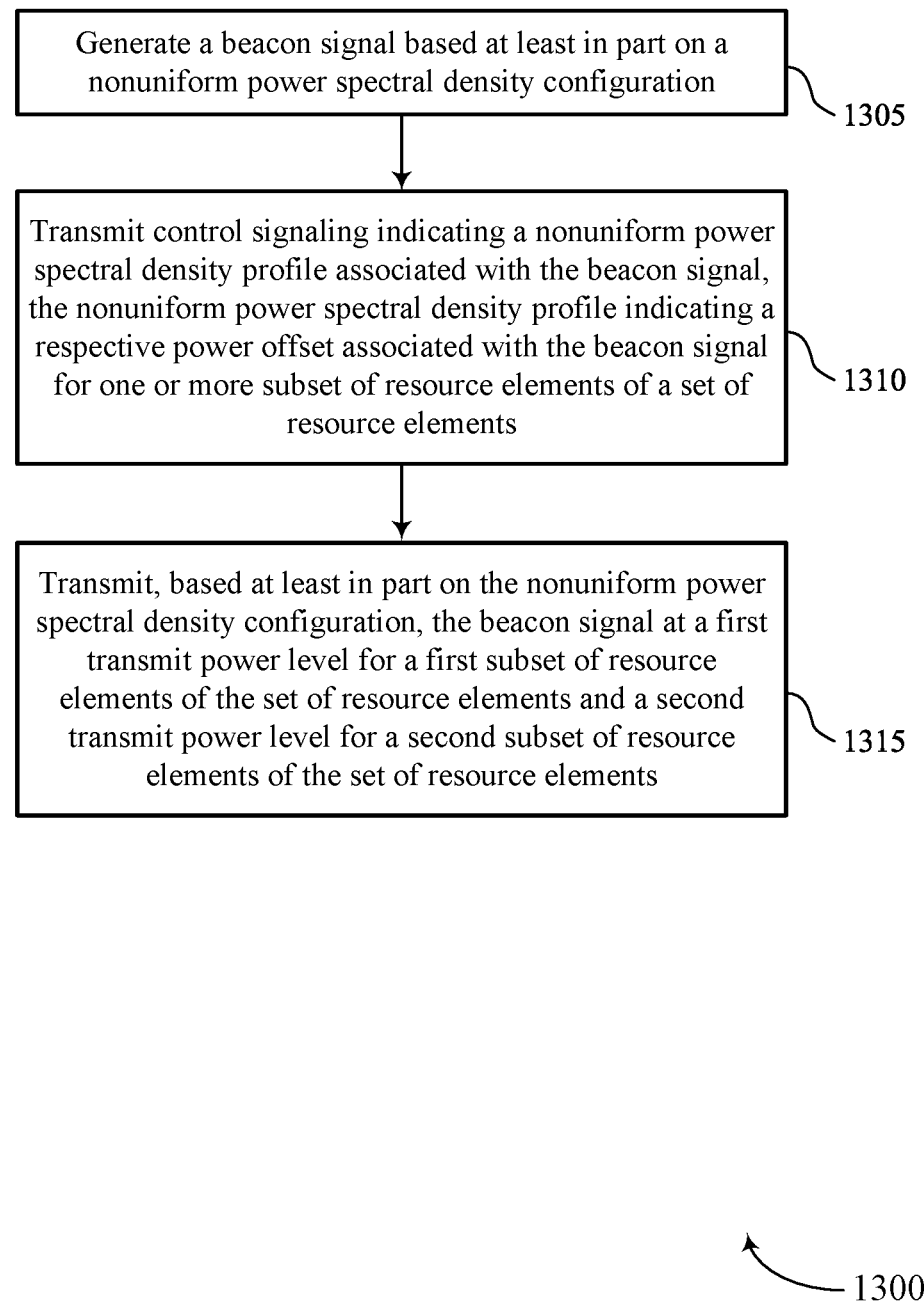

FIG. 13 shows a flowchart illustrating a method 1300 that supports managing wireless communications for leaky-wave antennas in accordance with aspects of the present disclosure. The operations of the method 1300 may be implemented by a device or its components as described herein. For example, the operations of the method 1300 may be performed by a device as described with reference to FIGS. 1 through 7. In some examples, a device may execute a set of instructions to control the functional elements of the device to perform the described functions. Additionally or alternatively, the device may perform aspects of the described functions using special-purpose hardware.

At 1305, the method may include generating a beacon signal based on a nonuniform power spectral density configuration. The operations of 1305 may be performed in accordance with examples as disclosed herein. In some examples, aspects of the operations of 1305 may be performed by a signal component 625 as described with reference to FIG. 6.

At 1310, the method may include transmitting control signaling indicating a nonuniform power spectral density profile associated with the beacon signal, the nonuniform power spectral density profile indicating a respective power offset associated with the beacon signal for one or more subset of resource elements of a set of resource elements. The operations of 1310 may be performed in accordance with examples as disclosed herein. In some examples, aspects of the operations of 1310 may be performed by a control component 630 as described with reference to FIG. 6.

At 1315, the method may include transmitting, based on the nonuniform power spectral density configuration, the beacon signal at a first transmit power level for a first subset of resource elements of the set of resource elements and a second transmit power level for a second subset of resource elements of the set of resource elements. The operations of 1315 may be performed in accordance with examples as disclosed herein. In some examples, aspects of the operations of 1315 may be performed by a power component 635 as described with reference to FIG. 6.

Figure 14:
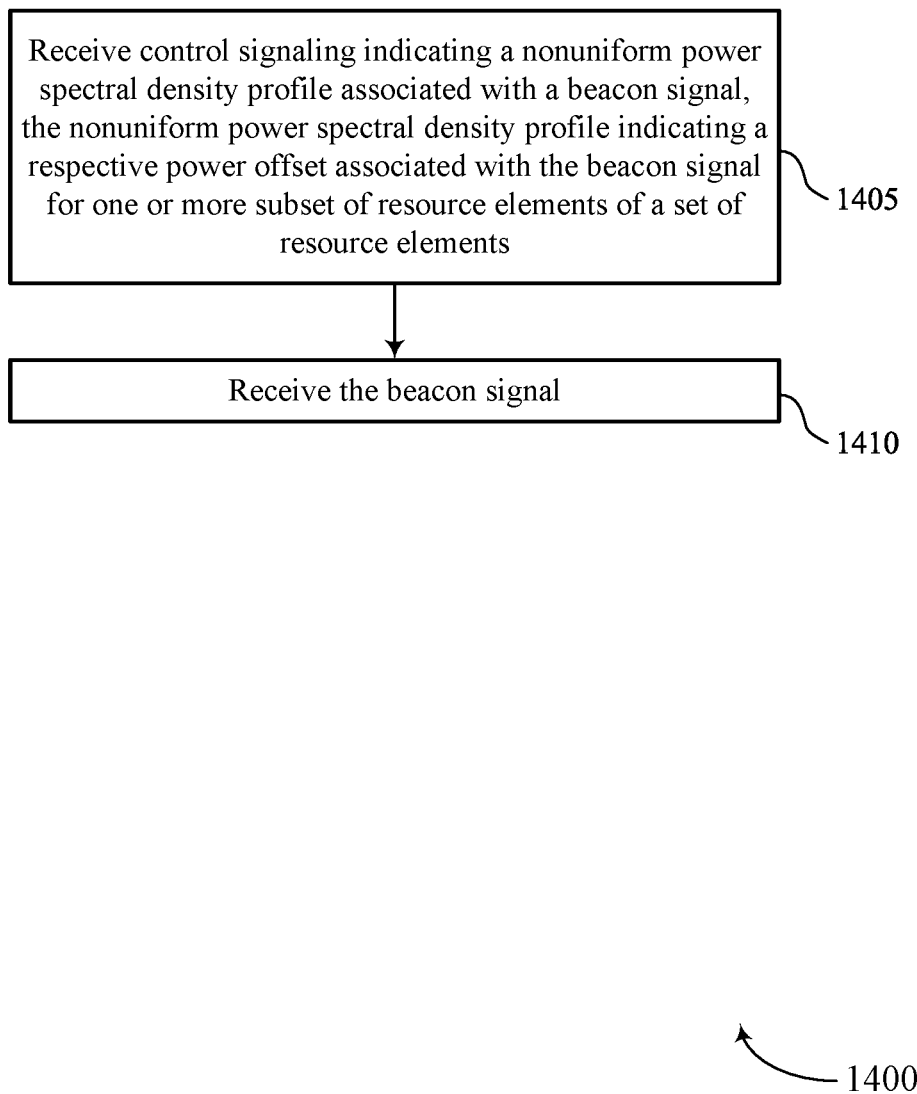

FIG. 14 shows a flowchart illustrating a method 1400 that supports managing wireless communications for leaky-wave antennas in accordance with aspects of the present disclosure. The operations of the method 1400 may be implemented by a device or its components as described herein. For example, the operations of the method 1400 may be performed by a device as described with reference to FIGS. 1 through 3 and 8 through 11. In some examples, a device may execute a set of instructions to control the functional elements of the device to perform the described functions. Additionally or alternatively, the device may perform aspects of the described functions using special-purpose hardware.

At 1405, the method may include receiving control signaling indicating a nonuniform power spectral density profile associated with a beacon signal, the nonuniform power spectral density profile indicating a respective power offset associated with the beacon signal for one or more subset of resource elements of a set of resource elements. The operations of 1405 may be performed in accordance with examples as disclosed herein. In some examples, aspects of the operations of 1405 may be performed by a control component 1025 as described with reference to FIG. 10.

At 1410, the method may include receiving the beacon signal. The operations of 1410 may be performed in accordance with examples as disclosed herein. In some examples, aspects of the operations of 1410 may be performed by a signal component 1030 as described with reference to FIG. 10.

Figure 15:
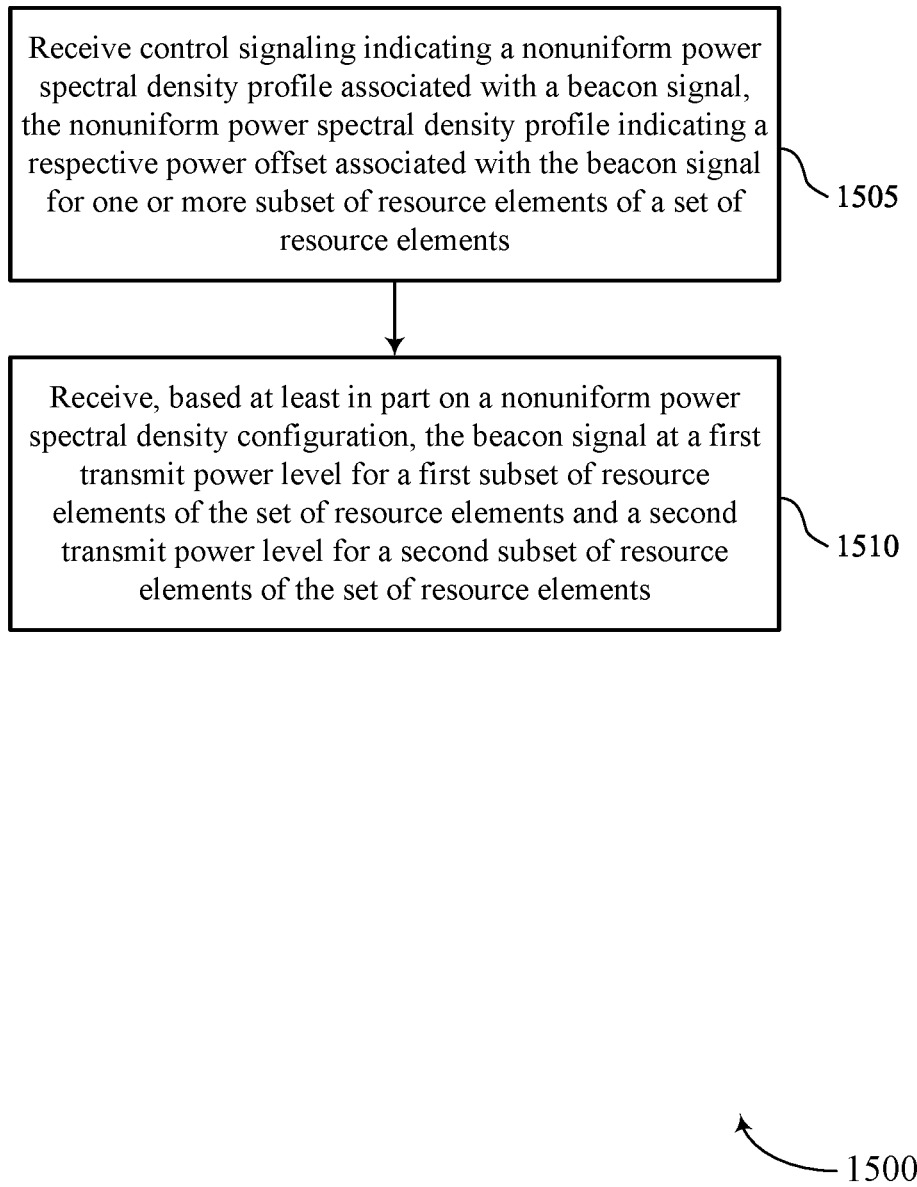

FIG. 15 shows a flowchart illustrating a method 1500 that supports managing wireless communications for leaky-wave antennas in accordance with aspects of the present disclosure. The operations of the method 1500 may be implemented by a device or its components as described herein. For example, the operations of the method 1500 may be performed by a device as described with reference to FIGS. 1 through 3 and 8 through 11. In some examples, a device may execute a set of instructions to control the functional elements of the device to perform the described functions. Additionally or alternatively, the device may perform aspects of the described functions using special-purpose hardware.

At 1505, the method may include receiving control signaling indicating a nonuniform power spectral density profile associated with a beacon signal, the nonuniform power spectral density profile indicating a respective power offset associated with the beacon signal for one or more subset of resource elements of a set of resource elements. The operations of 1505 may be performed in accordance with examples as disclosed herein. In some examples, aspects of the operations of 1505 may be performed by a control component 1025 as described with reference to FIG. 10.

At 1510, the method may include receiving, based on a nonuniform power spectral density configuration, the beacon signal at a first transmit power level for a first subset of resource elements of the set of resource elements and a second transmit power level for a second subset of resource elements of the set of resource elements. The operations of 1510 may be performed in accordance with examples as disclosed herein. In some examples, aspects of the operations of 1510 may be performed by a power component 1035 as described with reference to FIG. 10.

Figure 16:
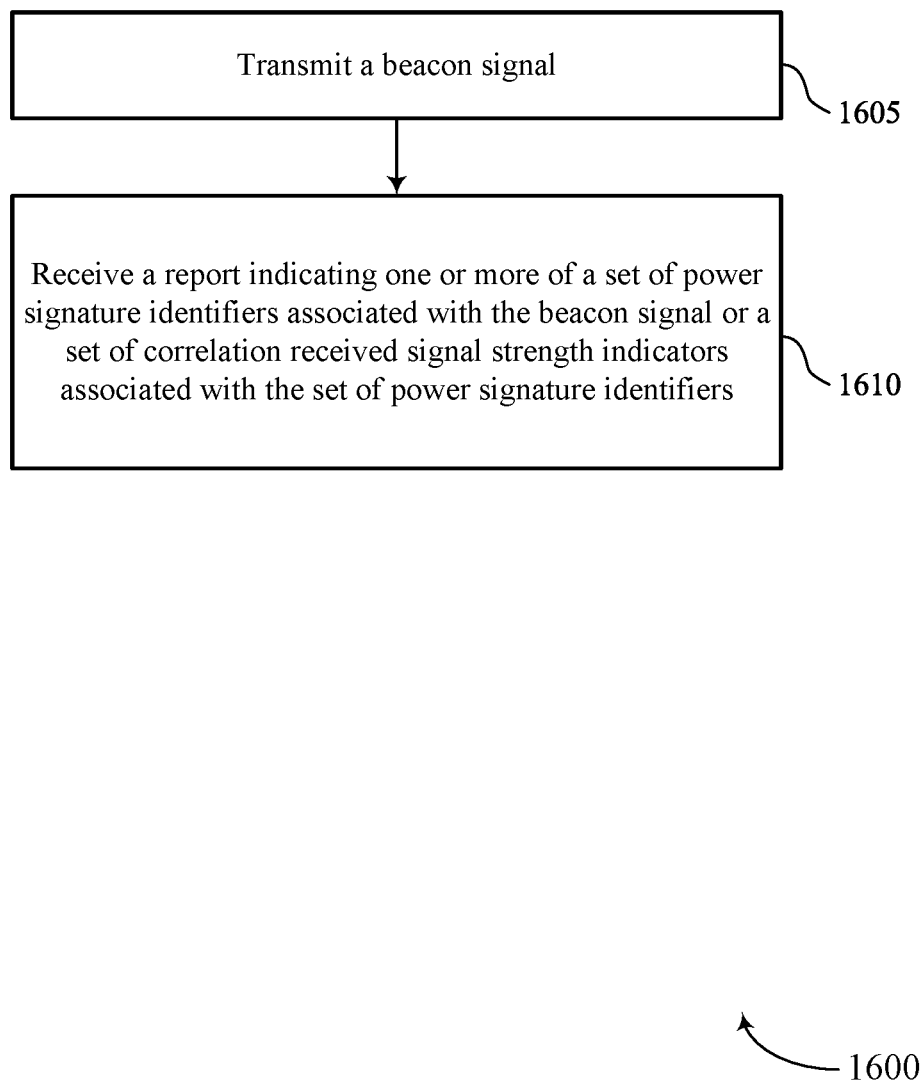

FIG. 16 shows a flowchart illustrating a method 1600 that supports managing wireless communications for leaky-wave antennas in accordance with aspects of the present disclosure. The operations of the method 1600 may be implemented by a device or its components as described herein. For example, the operations of the method 1600 may be performed by a device as described with reference to FIGS. 1 through 7. In some examples, a device may execute a set of instructions to control the functional elements of the device to perform the described functions. Additionally or alternatively, the device may perform aspects of the described functions using special-purpose hardware.

At 1605, the method may include transmitting a beacon signal. The operations of 1605 may be performed in accordance with examples as disclosed herein. In some examples, aspects of the operations of 1605 may be performed by a control component 630 as described with reference to FIG. 6.

At 1610, the method may include receiving a report indicating one or more of a set of power signature identifiers associated with the beacon signal or a set of correlation received signal strength indicators associated with the set of power signature identifiers. The operations of 1610 may be performed in accordance with examples as disclosed herein. In some examples, aspects of the operations of 1610 may be performed by a signal component 625 as described with reference to FIG. 6.

Figure 17:
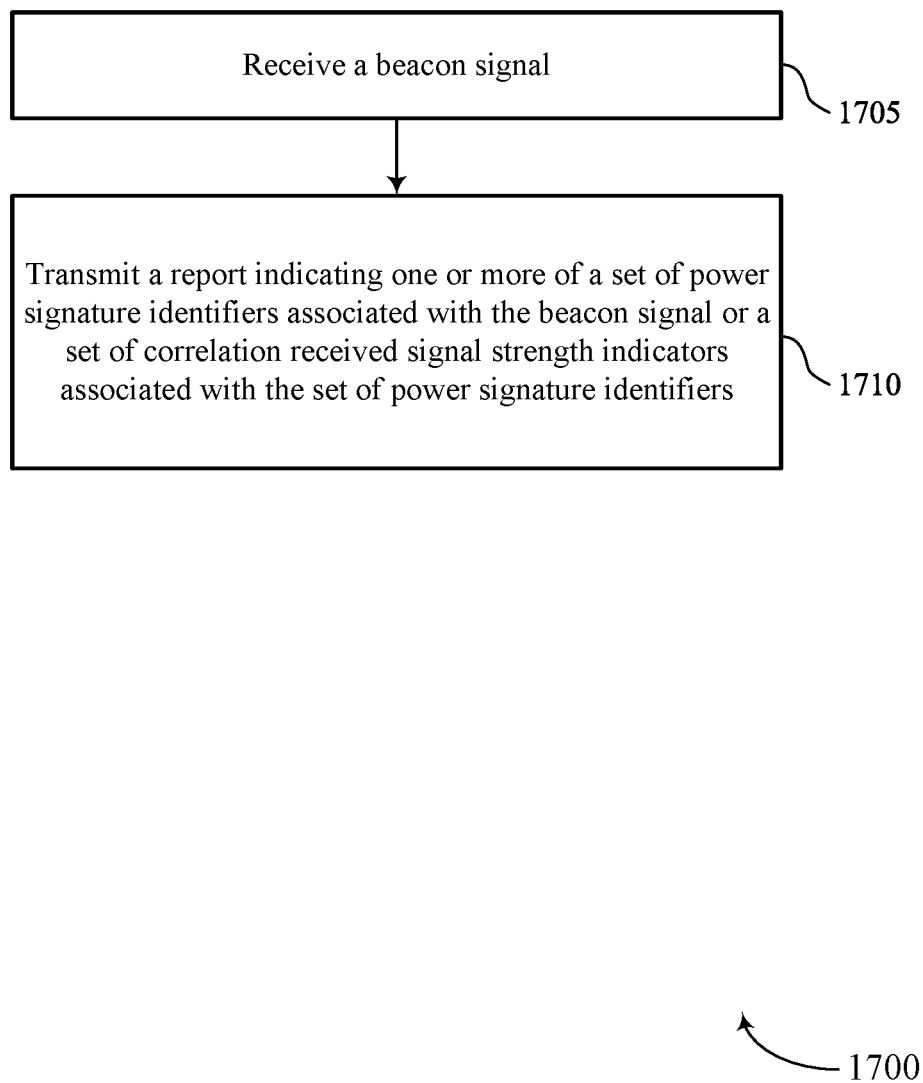

FIG. 17 shows a flowchart illustrating a method 1700 that supports managing wireless communications for leaky-wave antennas in accordance with aspects of the present disclosure. The operations of the method 1700 may be implemented by a device or its components as described herein. For example, the operations of the method 1700 may be performed by a device as described with reference to FIGS. 1 through 3 and 8 through 11. In some examples, a device may execute a set of instructions to control the functional elements of the device to perform the described functions. Additionally or alternatively, the device may perform aspects of the described functions using special-purpose hardware.

At 1705, the method may include receiving a beacon signal. The operations of 1705 may be performed in accordance with examples as disclosed herein. In some examples, aspects of the operations of 1705 may be performed by a signal component 1030 as described with reference to FIG. 10.

At 1710, the method may include transmitting, a report indicating one or more of a set of power signature identifiers associated with the beacon signal or a set of correlation received signal strength indicators associated with the set of power signature identifiers. The operations of 1710 may be performed in accordance with examples as disclosed herein. In some examples, aspects of the operations of 1710 may be performed by a control component 1025 as described with reference to FIG. 10.

The following provides an overview of aspects of the present disclosure:

Aspect 1: A method for wireless communication at a device, comprising: generating a beacon signal based at least in part on a nonuniform power spectral density configuration; transmitting control signaling indicating a nonuniform power spectral density profile associated with the beacon signal, the nonuniform power spectral density profile indicating a respective power offset associated with the beacon signal for one or more subset of resource elements of a set of resource elements; and transmitting the beacon signal.

Aspect 2: The method of aspect 1, wherein transmitting the beacon signal comprises: transmitting, based at least in part on the nonuniform power spectral density configuration, the beacon signal at a first transmit power level for a first subset of resource elements of the set of resource elements and a second transmit power level for a second subset of resource elements of the set of resource elements.

Aspect 3: The method of aspect 2, wherein the first subset of resource elements comprises a first subset of frequencies of a set of frequencies and the second subset of resource elements comprises a second subset of frequencies of the set of frequencies.

Aspect 4: The method of any of aspects 2 through 3, wherein the first subset of resource elements and the second subset of resource elements are associated with different time-domain resources and transmitting the beacon signal is based at least in part on time-division multiplexing the first subset of resource elements and the second subset of resource elements.

Aspect 5: The method of aspect 4, further comprising: transmitting second control signaling indicating a second nonuniform power spectral density profile associated with the second subset of resource elements, the second nonuniform power spectral density profile indicating a respective power offset associated with the second subset of resource elements.

Aspect 6: The method of any of aspects 4 through 5, wherein the first subset of resource elements spans a first bandwidth part of a bandwidth and the second subset of resource elements spans a second bandwidth part of the bandwidth.

Aspect 7: The method of any of aspects 4 through 6, wherein a first total transmit power level is split between each resource element of the first subset of resource elements and a second total transmit power level is split between each resource element of the second subset of resource elements.

Aspect 8: The method of any of aspects 1 through 7, further comprising: transmitting capability information indicating support for nonuniform power spectral density operation; and receiving second control signaling indicating the nonuniform power spectral density configuration based at least in part on the capability information, wherein the second control signaling comprises semi-static control signaling comprising RRC signaling, or dynamic control signaling comprising DCI or MAC-CE.

Aspect 9: A method for wireless communication at a device, comprising: transmitting a beacon signal; and receiving a report indicating one or more of a set of power signature identifiers associated with the beacon signal or a set of correlation RSSIs associated with the set of power signature identifiers.

Aspect 10: The method of aspect 9, wherein each correlation RSSI indicates a power amplitude associated with the beacon signal for each resource element of one or more subset of resource elements of a set of resource elements.

Aspect 11: The method of any of aspects 9 through 10, wherein the report indicates a RSSI value for a peak power amplitude associated with the beacon signal for one or more subset of resource elements of a set of resource elements.

Aspect 12: The method of any of aspects 9 through 11, wherein the report indicates an ordering of one or more of a set of estimated angle of departures associated with the beacon signal or the set of power signature identifiers.

Aspect 13: The method of any of aspects 9 through 12, wherein the report indicates that one or more of a respective estimated angle of departure of a set of estimated angle of departures or a respective power signature identifier of the set of power signature identifiers corresponds to a LOST path or a NLOS path.

Aspect 14: The method of any of aspects 9 through 13, wherein the report indicates a number of resource elements of a set of resource elements satisfying a power amplitude threshold, the number of resource elements of the set of resource elements neighboring a resource element corresponding to a peak power amplitude associated with the beacon signal.

Aspect 15: The method of any of aspects 9 through 14, wherein the report indicates one or more of a RSSI corresponding to a peak power amplitude associated with the beacon signal or an average RSSI corresponding to a number of resource elements of a set of resource elements neighboring a resource element corresponding to the peak power amplitude associated with the beacon signal.

Aspect 16: The method of any of aspects 9 through 15, wherein the report indicates a range of frequencies associated with a peak power amplitude associated with the beacon signal.

Aspect 17: The method of any of aspects 9 through 16, wherein the report indicates one or more of angle of departures or frequency regions for a plurality of clusters of resource element associated with the beacon signal based at least in part on a multipath propagation of the beacon signal.

Aspect 18: A method for wireless communication at a device, comprising: receiving control signaling indicating a nonuniform power spectral density profile associated with a beacon signal, the nonuniform power spectral density profile indicating a respective power offset associated with the beacon signal for one or more subset of resource elements of a set of resource elements; and receiving the beacon signal.

Aspect 19: The method of aspect 18, wherein receiving the beacon signal comprises: receiving, based at least in part on a nonuniform power spectral density configuration, the beacon signal at a first transmit power level for a first subset of resource elements of the set of resource elements and a second transmit power level for a second subset of resource elements of the set of resource elements.

Aspect 20: The method of aspect 19, wherein the first subset of resource elements comprises a first subset of frequencies of a set of frequencies and the second subset of resource elements comprises a second subset of frequencies of the set of frequencies.

Aspect 21: The method of any of aspects 19 through 20, wherein the first subset of resource elements and the second subset of resource elements are associated with different time-domain resources and receiving the beacon signal is based at least in part on a time-division multiplexing of the first subset of resource elements and the second subset of resource elements.

Aspect 22: The method of aspect 21, further comprising: receiving second control signaling indicating a second nonuniform power spectral density profile associated with the second subset of resource elements, the second nonuniform power spectral density profile indicating a respective power offset associated with the second subset of resource elements.

Aspect 23: The method of aspect 22, wherein the first subset of resource elements spans a first bandwidth part of a bandwidth and the second subset of resource elements spans a second bandwidth part of the bandwidth.

Aspect 24: The method of any of aspects 22 through 23, wherein a first total transmit power level is split between each resource element of the first subset of resource elements and a second total transmit power level is split between each resource element of the second subset of resource elements.

Aspect 25: The method of any of aspects 18 through 24, further comprising: receiving capability information indicating support for nonuniform power spectral density operation; and transmitting second control signaling indicating the nonuniform power spectral density configuration based at least in part on the capability information, wherein the second control signaling comprises semi-static control signaling comprising RRC signaling, or dynamic control signaling comprising DCI or MAC-CE.

Aspect 26: A method for wireless communication at a device, comprising: receiving a beacon signal; and transmitting a report indicating one or more of a set of power signature identifiers associated with the beacon signal or a set of correlation RSSIs associated with the set of power signature identifiers.

Aspect 27: The method of aspect 26, wherein each correlation RSSI indicates a power amplitude associated with the beacon signal for each resource element of one or more subset of resource elements of a set of resource elements.

Aspect 28: The method of any of aspects 26 through 27, wherein the report indicates a RSSI value for a peak power amplitude associated with the beacon signal for one or more subset of resource elements of a set of resource elements.

Aspect 29: The method of any of aspects 26 through 28, wherein the report indicates an ordering of one or more of a set of estimated angle of departures associated with the beacon signal or the set of power signature identifiers.

Aspect 30: The method of any of aspects 26 through 29, wherein the report indicates that one or more of a respective estimated angle of departure of a set of estimated angle of departures or a respective power signature identifier of the set of power signature identifiers corresponds to a LOS path or a NLOS path.

Aspect 31: An apparatus for wireless communication at a device, comprising a processor; memory coupled with the processor; and instructions stored in the memory and executable by the processor to cause the apparatus to perform a method of any of aspects 1 through 8.

Aspect 32: An apparatus for wireless communication at a device, comprising at least one means for performing a method of any of aspects 1 through 8.

Aspect 33: A non-transitory computer-readable medium storing code for wireless communication at a device, the code comprising instructions executable by a processor to perform a method of any of aspects 1 through 8.

Aspect 34: An apparatus for wireless communication at a device, comprising a processor; memory coupled with the processor; and instructions stored in the memory and executable by the processor to cause the apparatus to perform a method of any of aspects 9 through 17.

Aspect 35: An apparatus for wireless communication at a device, comprising at least one means for performing a method of any of aspects 9 through 17.

Aspect 36: A non-transitory computer-readable medium storing code for wireless communication at a device, the code comprising instructions executable by a processor to perform a method of any of aspects 9 through 17.

Aspect 37: An apparatus for wireless communication at a device, comprising a processor; memory coupled with the processor; and instructions stored in the memory and executable by the processor to cause the apparatus to perform a method of any of aspects 18 through 25.

Aspect 38: An apparatus for wireless communication at a device, comprising at least one means for performing a method of any of aspects 18 through 25.

Aspect 39: A non-transitory computer-readable medium storing code for wireless communication at a device, the code comprising instructions executable by a processor to perform a method of any of aspects 18 through 25.

Aspect 40: An apparatus for wireless communication at a device, comprising a processor; memory coupled with the processor; and instructions stored in the memory and executable by the processor to cause the apparatus to perform a method of any of aspects 26 through 30.

Aspect 41: An apparatus for wireless communication at a device, comprising at least one means for performing a method of any of aspects 26 through 30.

Aspect 42: A non-transitory computer-readable medium storing code for wireless communication at a device, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:
   generating a beacon signal based at least in part on a nonuniform power spectral density configuration;
   transmitting control signaling comprising information indicative of a nonuniform power spectral density profile associated with the beacon signal, the control signaling being separate from the beacon signal, and the nonuniform power spectral density profile indicating a respective power offset associated with the beacon signal for one or more subset of resource elements of a set of resource elements; and
   transmitting the beacon signal in accordance with the nonuniform power spectral density profile.

2. The method of claim 1, wherein transmitting the beacon signal comprises:
   transmitting, based at least in part on the nonuniform power spectral density configuration, the beacon signal at a first transmit power level for a first subset of resource elements of the set of resource elements and a second transmit power level for a second subset of resource elements of the set of resource elements.

3. The method of claim 2, wherein the first subset of resource elements comprises a first subset of frequencies of a set of frequencies and the second subset of resource elements comprises a second subset of frequencies of the set of frequencies.

4. The method of claim 2, wherein:
   the first subset of resource elements and the second subset of resource elements are associated with different time-domain resources and transmitting the beacon signal is based at least in part on time-division multiplexing the first subset of resource elements and the second subset of resource elements.

5. The method of claim 4, further comprising:
   transmitting second control signaling indicating a second nonuniform power spectral density profile associated with the second subset of resource elements, the second nonuniform power spectral density profile indicating a respective power offset associated with the second subset of resource elements.

6. The method of claim 4, wherein the first subset of resource elements spans a first bandwidth part of a bandwidth and the second subset of resource elements spans a second bandwidth part of the bandwidth.

7. The method of claim 4, wherein a first total transmit power level is split between each resource element of the first subset of resource elements and a second total transmit power level is split between each resource element of the second subset of resource elements.

8. The method of claim 1, further comprising:
   transmitting capability information indicating support for nonuniform power spectral density operation; and
   receiving second control signaling indicating the nonuniform power spectral density configuration based at least in part on the capability information,
   wherein the second control signaling comprises semi-static control signaling comprising radio resource control signaling, or dynamic control signaling comprising downlink control information or medium access control-control element.

9. A method for wireless communication at a device, comprising:
   receiving control signaling comprising information indicative of a nonuniform power spectral density profile associated with a beacon signal, the control signaling being separate from the beacon signal, and the nonuniform power spectral density profile indicating a respective power offset associated with the beacon signal for one or more subset of resource elements of a set of resource elements; and
   receiving the beacon signal in accordance with the nonuniform power spectral density profile.

10. The method of claim 9, wherein receiving the beacon signal comprises:
    receiving, based at least in part on a nonuniform power spectral density configuration, the beacon signal at a first transmit power level for a first subset of resource elements of the set of resource elements and a second transmit power level for a second subset of resource elements of the set of resource elements.

11. The method of claim 10, wherein the first subset of resource elements comprises a first subset of frequencies of a set of frequencies and the second subset of resource elements comprises a second subset of frequencies of the set of frequencies.

12. The method of claim 10, wherein:
the first subset of resource elements and the second subset of resource elements are associated with different time-domain resources and receiving the beacon signal is based at least in part on a time-division multiplexing of the first subset of resource elements and the second subset of resource elements.

13. The method of claim 12, further comprising:
receiving second control signaling indicating a second nonuniform power spectral density profile associated with the second subset of resource elements, the second nonuniform power spectral density profile indicating a respective power offset associated with the second subset of resource elements.

14. The method of claim 10, further comprising:
receiving capability information indicating support for nonuniform power spectral density operation; and
transmitting second control signaling indicating the nonuniform power spectral density configuration based at least in part on the capability information,
wherein the second control signaling comprises semi-static control signaling comprising radio resource control signaling, or dynamic control signaling comprising downlink control information or medium access control-control element.

15. A device for wireless communication, comprising:
one or more memories storing processor-executable code; and
one or more processors coupled with the one or more memories and individually or collectively operable to execute the code to cause the device to:
generate a beacon signal based at least in part on a nonuniform power spectral density configuration;
transmit control signaling comprising information indicative of a nonuniform power spectral density profile associated with the beacon signal, the control signaling being separate from the beacon signal, and the nonuniform power spectral density profile indicating a respective power offset associated with the beacon signal for one or more subset of resource elements of a set of resource elements; and
transmit the beacon signal in accordance with the nonuniform power spectral density profile.

16. The device of claim 15, wherein, to transmit the beacon signal, the one or more processors are individually or collectively operable to execute the code to cause the device to:
transmit, based at least in part on the nonuniform power spectral density configuration, the beacon signal at a first transmit power level for a first subset of resource elements of the set of resource elements and a second transmit power level for a second subset of resource elements of the set of resource elements.

17. The device of claim 16, wherein the first subset of resource elements comprises a first subset of frequencies of a set of frequencies and the second subset of resource elements comprises a second subset of frequencies of the set of frequencies.

18. The device of claim 16, wherein the first subset of resource elements and the second subset of resource elements are associated with different time-domain resources and transmitting the beacon signal is based at least in part on time-division multiplexing the first subset of resource elements and the second subset of resource elements.

19. The device of claim 18, wherein the one or more processors are individually or collectively further operable to execute the code to cause the device to:
transmit second control signaling indicating a second nonuniform power spectral density profile associated with the second subset of resource elements, the second nonuniform power spectral density profile indicating a respective power offset associated with the second subset of resource elements.

20. The device of claim 18, wherein the first subset of resource elements spans a first bandwidth part of a bandwidth and the second subset of resource elements spans a second bandwidth part of the bandwidth.

21. The device of claim 18, wherein a first total transmit power level is split between each resource element of the first subset of resource elements and a second total transmit power level is split between each resource element of the second subset of resource elements.

22. The device of claim 15, wherein the one or more processors are individually or collectively further operable to execute the code to cause the device to:
transmit capability information indicating support for nonuniform power spectral density operation; and
receive second control signaling indicating the nonuniform power spectral density configuration based at least in part on the capability information, wherein the second control signaling comprises semi-static control signaling comprising radio resource control signaling, or dynamic control signaling comprising downlink control information or medium access control-control element.

23. A device for wireless communication, comprising:
one or more memories storing processor-executable code; and
one or more processors coupled with the one or more memories and individually or collectively operable to execute the code to cause the device to:
receive control signaling comprising information indicative of a nonuniform power spectral density profile associated with a beacon signal, the control signaling being separate from the beacon signal, and the nonuniform power spectral density profile indicating a respective power offset associated with the beacon signal for one or more subset of resource elements of a set of resource elements; and
receive the beacon signal in accordance with the nonuniform power spectral density profile.

24. The device of claim 23, wherein, to receive the beacon signal, the one or more processors are individually or collectively operable to execute the code to cause the device to:
receive, based at least in part on a nonuniform power spectral density configuration, the beacon signal at a first transmit power level for a first subset of resource elements of the set of resource elements and a second transmit power level for a second subset of resource elements of the set of resource elements.

25. The device of claim 24, wherein the first subset of resource elements comprises a first subset of frequencies of a set of frequencies and the second subset of resource elements comprises a second subset of frequencies of the set of frequencies.

26. The device of claim 24, wherein the first subset of resource elements and the second subset of resource elements are associated with different time-domain resources and receiving the beacon signal is based at least in part on a time-division multiplexing of the first subset of resource elements and the second subset of resource elements.

27. The device of claim 26, wherein the one or more processors are individually or collectively further operable to execute the code to cause the device to:

receive second control signaling indicating a second nonuniform power spectral density profile associated with the second subset of resource elements, the second nonuniform power spectral density profile indicating a respective power offset associated with the second subset of resource elements.

28. The device of claim 27, wherein the first subset of resource elements spans a first bandwidth part of a bandwidth and the second subset of resource elements spans a second bandwidth part of the bandwidth.

29. The device of claim 24, wherein the one or more processors are individually or collectively further operable to execute the code to cause the device to:

receive capability information indicating support for nonuniform power spectral density operation; and transmit second control signaling indicating the nonuniform power spectral density configuration based at least in part on the capability information, wherein the second control signaling comprises semi-static control signaling comprising radio resource control signaling, or dynamic control signaling comprising downlink control information or medium access control-control element.

30. The method of claim 1, wherein generating the beacon signal comprises:

generating the beacon signal based at least in part on the nonuniform power spectral density configuration resulting from a slotted waveguide antenna configuration at the device, wherein the beacon signal is transmitted using the slotted waveguide antenna configuration and in accordance with the nonuniform power spectral density profile.

* * * * *